US011363105B2

(12) United States Patent
Liu et al.

(10) Patent No.: US 11,363,105 B2
(45) Date of Patent: Jun. 14, 2022

(54) DETERMINING A TARGET SERVICE BASED ON A SERVICE DISCOVERY REQUEST

(71) Applicant: Huawei Technologies Co., Ltd., Shenzhen (CN)

(72) Inventors: Ruizhi Liu, Beijing (CN); Qianghua Zhu, Beijing (CN); Chunshan Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/700,445

(22) Filed: Dec. 2, 2019

(65) Prior Publication Data
US 2020/0106840 A1 Apr. 2, 2020

Related U.S. Application Data

(63) Continuation of application No. PCT/CN2018/089502, filed on Jun. 1, 2018.

(30) Foreign Application Priority Data

Jun. 2, 2017 (CN) .......................... 201710408088.4

(51) Int. Cl.
*H04L 29/08* (2006.01)
*H04L 67/51* (2022.01)
(Continued)

(52) U.S. Cl.
CPC ............. *H04L 67/16* (2013.01); *H04L 67/26* (2013.01); *H04L 67/2833* (2013.01); *H04L 67/2838* (2013.01)

(58) Field of Classification Search
CPC ..... H04L 67/16; H04L 67/26; H04L 67/2833; H04L 67/2838
(Continued)

(56) References Cited

U.S. PATENT DOCUMENTS 7,844,680 B2 * 11/2010 Ha .................. H04L 12/2818
709/208
7,853,694 B2 * 12/2010 Kim .................... H04L 67/28
709/226
(Continued)

FOREIGN PATENT DOCUMENTS

CN 104426871 A 3/2015
CN 105245595 A 1/2016
(Continued)

OTHER PUBLICATIONS

Machine Translation and Abstract of Chinese Publication No. CN105245595, Jan. 13, 2016, 35 pages.
(Continued)

*Primary Examiner* — David P Zarka
(74) *Attorney, Agent, or Firm* — Conley Rose, P.C.

(57) ABSTRACT

A service discovery method, a registration center, and a device, where the method includes: receiving, by a registration center, a service discovery request sent by a first device, where the service discovery request carries target parameter information of a service needed by the first device, and where the target parameter information includes at least one of information about a first transmission mode, information about an invocation mode, information about a transmission protocol, or information about a second transmission mode; determining, by the registration center based on a service parameter database, a target service corresponding to the target parameter information, where the service parameter database is used to store parameter information of different services of a second device; and sending, by the registration center, a service response message to the first device, where the service response message includes description information of the target service.

13 Claims, 14 Drawing Sheets

(51) Int. Cl.
*H04L 67/55* (2022.01)
*H04L 67/566* (2022.01)
*H04L 67/567* (2022.01)

(58) Field of Classification Search
USPC .......................................................... 709/223
See application file for complete search history.

(56) References Cited

U.S. PATENT DOCUMENTS

| | | | |
|---|---|---|---|
| 8,635,341 B2* | 1/2014 | Modi | H04L 67/16 709/226 |
| 8,832,302 B1* | 9/2014 | Bradford | H04W 4/50 709/232 |
| 9,007,945 B2* | 4/2015 | Nguyen | H04L 41/5058 370/252 |
| 9,112,712 B2* | 8/2015 | Ma | G06Q 30/02 |
| 9,552,232 B2* | 1/2017 | Mukherjee | H04L 67/16 |
| 9,807,677 B2* | 10/2017 | Kim | H04W 48/14 |
| 9,876,862 B1* | 1/2018 | Lambert | H04L 67/16 |
| 10,104,707 B2* | 10/2018 | Li | H04W 76/10 |
| 10,313,961 B2* | 6/2019 | Jung | H04W 8/005 |
| 10,462,149 B2* | 10/2019 | Trigger | H04L 67/10 |
| 10,701,745 B2* | 6/2020 | Hunt | H04W 12/04 |
| 10,757,104 B1* | 8/2020 | Goel | H04L 63/0884 |
| 10,764,393 B2* | 9/2020 | Casassa Mont | H04L 61/2015 |
| 2003/0061294 A1 | 3/2003 | Stennicke | |
| 2005/0136905 A1* | 6/2005 | Son | H04L 67/306 455/418 |
| 2005/0234873 A1 | 10/2005 | Milligan et al. | |
| 2006/0050672 A1 | 3/2006 | Shim et al. | |
| 2007/0208587 A1 | 9/2007 | Sitaraman | |
| 2008/0140797 A1* | 6/2008 | Ha | H04L 12/2825 709/208 |
| 2014/0192717 A1* | 7/2014 | Liu | H04L 67/16 370/328 |
| 2014/0204803 A1* | 7/2014 | Nguyen | H04L 67/16 370/255 |
| 2015/0019620 A1 | 1/2015 | Gidron et al. | |
| 2016/0088420 A1 | 3/2016 | Kim et al. | |
| 2016/0205152 A1 | 7/2016 | Zhou | |
| 2016/0301739 A1* | 10/2016 | Thompson | G06F 9/547 |
| 2016/0338125 A1* | 11/2016 | Kim | H04W 76/14 |
| 2017/0048788 A1* | 2/2017 | Chen | H04W 48/16 |

FOREIGN PATENT DOCUMENTS

| | | |
|---|---|---|
| CN | 105516250 A | 4/2016 |
| CN | 106330398 A | 1/2017 |
| EP | 2367356 B1 | 5/2012 |
| JP | 2004530969 A | 10/2004 |
| JP | 2008503148 A | 1/2008 |
| JP | 2014173891 A | 9/2014 |
| JP | 2016526322 A | 9/2016 |
| KR | 20110086193 A | 7/2011 |
| WO | 2001031463 A1 | 5/2001 |
| WO | 2016199515 A1 | 12/2016 |

OTHER PUBLICATIONS

Machine Translation and Abstract of Chinese Publication No. CN105516250, Apr. 20, 2016, 14 pages.
Machine Translation and Abstract of Chinese Publication No. CN106330398, Jan. 11, 2017, 14 pages.
Foreign Communication From a Counterpart Application, Chinese Application No. 201710408088.4, Chinese Office Action dated Dec. 4, 2019, 12 pages.
Foreign Communication From a Counterpart Application, Chinese Application No. 201710408088.4, Chinese Search Report dated Nov. 25, 2019, 2 pages.
Foreign Communication From a Counterpart Application, PCT Application No. PCT/CN2018/089502, English Translation of International Search Report dated Aug. 23, 2018, 2 pages.
Foreign Communication From a Counterpart Application, PCT Application No. PCT/CN2018/089502, English Translation of Written Opinion dated Aug. 23, 2018, 4 pages.

* cited by examiner

DETERMINING A TARGET SERVICE BASED ON A SERVICE DISCOVERY REQUEST

CROSS-REFERENCE TO RELATED APPLICATIONS

This application is a continuation of International Patent Application No. PCT/CN2018/089502, filed on Jun. 1, 2018, which claims priority to Chinese Patent Application No. 201710408088.4, filed on Jun. 2, 2017. The disclosures of the aforementioned applications are hereby incorporated by reference in their entireties.

TECHNICAL FIELD

This application relates to the communications field, and more specifically, to a service discovery method, a registration center, and a device.

BACKGROUND

Service registration and discovery is a directory service that facilitates a service definition, service selection, and a service execution policy. As a service supplier, a service provider registers service information of the service provider with a service registration center. The service registration center mainly provides central storage for all service registration information, and is responsible for sending a service registration information update notification to a service consumer in real time. The service consumer obtains needed service registration information from the service registration center, and invokes a service.

In a network service system, a service provider publishes a provided network service in a registration center, a client discovers a needed network service in the registration center, and the client obtains an end point of the network service. Service performance (for example, a supported protocol and a transmission mode) in a conventional network system is relatively simple. The client may select a proper service based on a service identity (ID). A fixed format is usually used during network service invocation. As the network system is upgraded, that is, as services tend to be diversified, the client cannot find a proper service using a conventional solution. This deteriorates service quality.

SUMMARY

This application provides a service discovery method, a registration center, and a device, such that a service consumer can find a proper service, thereby improving service quality.

According to a first aspect, a service discovery method is provided. The method includes receiving, by a registration center, a service discovery request sent by a first device, where the service discovery request carries target parameter information of a service needed by the first device, and where the target parameter information includes at least one of information about a first transmission mode, information about an invocation mode, information about a transmission protocol, or information about a second transmission mode. The information about the first transmission mode is an in-band identifier or an out-of-band identifier, where the in-band identifier is used to indicate a transmission mode in which invocation information is added to data for transmission between the first device and a second device, while the out-of-band identifier is used to indicate a transmission mode in which the data and the invocation information are separately transmitted between the first device and the second device. The invocation mode is one-request-one-response or one-request-multiple-response. The transmission protocol is any one of a Representational State Transfer Application Programming Interface Protocol, an Advanced Message Queue Interface Protocol, a Message Queuing Telemetry Transport Protocol, or a Remote Procedure Call Protocol. The second transmission mode comprises transmitting information between the first device and the second device directly or using an intermediate node. The method further includes: determining, by the registration center based on a service parameter database, a target service corresponding to the target parameter information, where the service parameter database is used to store parameter information of different services of the second device; and sending, by the registration center, a service response message to the first device, where the service response message includes description information of the target service.

The registration center: receives the service discovery request sent by the first device, where the service discovery request carries the target parameter information of the service needed by the first device, and the target parameter information includes the at least one of the information about the first transmission mode, the information about the invocation mode, the information about the transmission protocol, or the information about the second transmission mode; determines, based on the service parameter database, the target service corresponding to the target parameter information; and sends the service response message including the description information of the target service to the first device. In this way, among diversified services, a proper service can be found for the first device based on parameter information corresponding to an application service. Therefore, service quality can be improved, and system processing efficiency can be enhanced.

In some possible implementations, before determining, by the registration center based on a service parameter database, a target service corresponding to the target parameter information, the method further includes: receiving, by the registration center, a registration request sent by the second device, where the registration request includes parameter information of a first service of the second device; and storing, by the registration center, the parameter information of the first service into the service parameter database.

The registration center may store parameter information of a plurality of different services into the parameter database; and after receiving the service discovery request, query the parameter database for parameter information satisfying a requirement, and determine a service corresponding to the parameter information satisfying the requirement. The registration center grants different registration requests, and stores parameter information of a service that can be provided, in order to find, for the first device, the second device satisfying the requirement. In this way, a proper service can be found for the first device, thereby improving service quality.

In some possible implementations, the target parameter information includes the information about the first transmission mode. Additionally, determining, by the registration center based on a service parameter database, a target service corresponding to the target parameter information includes: if the information about the first transmission mode is the in-band identifier, determining, by the registration center, a service corresponding to parameter information that is in the service parameter database and that includes the in-band identifier, as the target service.

If the information about the first transmission mode included in the target parameter information is the in-band identifier, that is, if the invocation information needs to be sent by the first device needs to be added to the data, the registration center selects, for the first device, the service for which the invocation information can be carried in the data, such that the first device can obtain the service of high quality.

In some possible implementations, the target parameter information includes the information about the invocation mode. Additionally, determining, by the registration center based on a service parameter database, a target service corresponding to the target parameter information includes: if the invocation mode is the one-request-one-response, determining, by the registration center, a service corresponding to parameter information that is in the service parameter database and that includes information about the one-request-one-response, as the target service.

If the information about the invocation mode included in the target parameter information is the information about the one-request-one-response, the registration center searches for the service corresponding to the parameter information including the information about the one-request-one-response, and sends the description information of the service to the first device, such that the first device can obtain the service of high quality.

In some possible implementations, the target parameter information includes the information about the transmission protocol. Additionally, determining, based on a service parameter database, a target service corresponding to the target parameter information includes, when the transmission protocol is the Advanced Message Queue Interface Protocol, determining, by the registration center, a service corresponding to parameter information that is in the service parameter database and that includes information about the Advanced Message Queue Interface Protocol, as the target service.

If the information about the transmission protocol included in the target parameter information is the information about the Advanced Message Queue Interface Protocol, the registration center searches for the service corresponding to the parameter information including the information about the Advanced Message Queue Interface Protocol, for the first device, and sends the description information of the service to the first device, such that the first device can obtain the service of high quality.

In some possible implementations, the target parameter information includes the second transmission mode. Additionally, determining, by the registration center based on a service parameter database, a target service corresponding to the target parameter information includes: determining, by the registration center when the second transmission mode comprises transmitting the information between the first device and the second device using the intermediate node, a service corresponding to parameter information that is in the service parameter database and that includes information indicating that transmission is performed using the intermediate node, as the target service.

If the information about the second transmission mode included in the target parameter information is the information indicating that transmission is performed using the intermediate node, the registration center searches for the service corresponding to the parameter information including the information indicating that transmission is performed using the intermediate node, for the first device, and sends the description information of the service to the first device, such that the first device can obtain the service of high quality.

In some possible implementations, the target parameter information further includes location information of the intermediate node, and the intermediate node is located on a third-party device, the registration center, or the second device. Additionally, determining, by the registration center when the second transmission mode is performing transmission using the intermediate node, a service corresponding to parameter information that is in the service parameter database and that includes information indicating that transmission is performed using the intermediate node, as the target service includes: determining, by the registration center when the second transmission mode is performing transmission using the intermediate node and the intermediate node is located at the third-party device, a service corresponding to parameter information that is in the service parameter database and that includes information indicating that transmission is performed using the intermediate node and that the intermediate node is located at the third-party device, as the target service.

If the information about the second transmission mode included in the target parameter information is the information indicating that transmission is performed using the intermediate node and that the intermediate node is located at the third-party device, the registration center searches for the service corresponding to the parameter information including the information indicating that transmission is performed using the intermediate node and that the intermediate node is located at the third-party device, for the first device, and sends the description information of the service to the first device, such that the first device can obtain the service of high quality.

In some possible implementations, the network service system is a mobile edge computing system, which includes a mobile edge orchestrator and a mobile edge host. The mobile edge host includes a mobile edge platform, a first mobile edge application, and a second mobile edge application. The mobile edge platform corresponds to the registration center, the first mobile edge application corresponds to the first device, and the second mobile edge application corresponds to the second device. The mobile edge orchestrator is configured to manage the first mobile edge application and the second mobile edge application.

Among diversified services, a proper service can be found for the first mobile edge application based on application service supporting parameter information. Especially among application services that support a plurality of interface protocols or different invocation modes, the first mobile edge application can select a satisfactory interface protocol or invocation mode for transmitting the invocation information, thereby improving transmission efficiency.

In some possible implementations, the network service system is a services and systems aspects work group 6 system. The services and systems aspects work group 6 system includes a service registration server, a mission-critical service, and an external application. The service registration server corresponds to the registration center, the external application corresponds to the first device, and the mission-critical service corresponds to the second device.

In this way, among diversified services, a proper service can be found for the external application based on service supporting parameter information. Especially, a trusted application or an application in a same domain can directly access the service, whereas an untrusted application or an application in another domain can access the service only after authentication, format conversion, or the like is performed by an intermediate entity. This improves security performance of the network system.

In some possible implementations, the network service system is a services and systems aspects work group 2 system. The services and systems aspects work group 2 system includes a network function repository function, a first network function instance, and a second network function instance. The network function repository function corresponds to the registration center, the first network function instance corresponds to the first device, and the second network function instance corresponds to the second device.

In this way, among diversified services, a proper service can be found for the first network function instance based on service supporting parameter information. Especially, selecting a proper transmission protocol can normalize interface invocation, that is, appropriately allocate an interface to improve the service, thereby enhancing processing efficiency of the network system.

According to a second aspect, a service discovery method is provided. The method includes: sending, by a first device, a service discovery request, where the service discovery request carries target parameter information of a service needed by the first device and the service discovery request is used to determine, based on a service parameter database, a target service corresponding to the target parameter information, the target parameter information includes at least one of information about a first transmission mode, information about an invocation mode, information about a transmission protocol, or information about a second transmission mode, the information about the first transmission mode is an in-band identifier or an out-of-band identifier, the in-band identifier is used to indicate a transmission mode in which invocation information is added to data for transmission between the first device and a second device, the out-of-band identifier is used to indicate a transmission mode in which the data and the invocation information are separately transmitted between the first device and the second device, the invocation mode is one-request-one-response or one-request-multiple-response, the transmission protocol is any one of a Representational State Transfer Application Programming Interface Protocol, an Advanced Message Queue Interface Protocol, a Message Queuing Telemetry Transport Protocol, or a Remote Procedure Call Protocol, and the second transmission mode comprises transmitting information between the first device and the second device directly or using an intermediate node; receiving, by the first device, a service response message, where the service response message includes description information of the target service; and sending, by the first device, the invocation information to the second device, where the invocation information is used to invoke the target service.

The first device sends the service discovery request to a registration center, where the service discovery request carries the target parameter information of the service needed by the first device and the service discovery request is used to determine, based on the service parameter database, the target service corresponding to the target parameter information, and the target parameter information includes the at least one of the information about the first transmission mode, the information about the invocation mode, the information about the transmission protocol, or the information about the second transmission mode; and receives the service response message, sent by the registration center, including the description information of the target service. In this way, among diversified services, a proper service can be found for the first device based on service supporting parameter information. Therefore, service quality can be improved, and system processing efficiency can be enhanced.

In some possible implementations, when the second transmission mode comprises transmitting the information between the first device and the second device using the intermediate node, the target parameter information further includes a location of the intermediate node. The intermediate node is located on a third-party device, the registration center, or the second device.

If the information about the second transmission mode included in the target parameter information is information indicating that transmission is performed using the intermediate node and that the intermediate node is located at the third-party device, the first device receives the description information, determined by the registration center through searching, of the target service corresponding to the parameter information including the information indicating that transmission is performed using the intermediate node and that the intermediate node is located at the third-party device. In this way, the first device can obtain the service of high quality.

In some possible implementations, the network service system is a mobile edge computing system. The mobile edge computing system includes a mobile edge orchestrator and a mobile edge host, which includes a mobile edge platform, a first mobile edge application, and a second mobile edge application. The mobile edge platform corresponds to the registration center, the first mobile edge application corresponds to the first device, and the second mobile edge application corresponds to the second device. The mobile edge orchestrator is configured to manage the first mobile edge application and the second mobile edge application.

Among diversified services, a proper service can be found for the first mobile edge application based on application service supporting parameter information. Especially among application services that support a plurality of interface protocols or different invocation modes, the first mobile edge application can select a satisfactory interface protocol or invocation mode for transmitting the invocation information, thereby improving transmission efficiency.

In some possible implementations, the network service system is a services and systems aspects work group 6 system. The services and systems aspects work group 6 system includes a service registration server, a mission-critical service, and an external application. The service registration server corresponds to the registration center, the external application corresponds to the first device, and the mission-critical service corresponds to the second device.

In this way, among diversified services, a proper service can be found for the external application based on service supporting parameter information. Especially, a trusted application or an application in a same domain can directly access the service, whereas an untrusted application or an application in another domain can access the service only after authentication, format conversion, or the like is performed by an intermediate entity. This improves security performance of the network system.

In some possible implementations, the network service system is a services and systems aspects work group 2 system, which includes a network function repository function, a first network function instance, and a second network function instance. The network function repository function corresponds to the registration center, the first network function instance corresponds to the first device, and the second network function instance corresponds to the second device.

In this way, among diversified services, a proper service can be found for the first network function instance based on service supporting parameter information. Especially, selecting a proper transmission protocol can normalize interface invocation, that is, appropriately allocate an interface to improve the service, thereby enhancing processing efficiency of the network system.

According to a third aspect, a service discovery method is provided. The method includes: sending, by a second device, a registration request to a registration center, where the registration request includes parameter information of a first service, such that the registration center stores the parameter information of the first service into a service parameter database, where the service parameter database is used to determine a target service corresponding to target parameter information, the target parameter information is parameter information of a service needed by a first device, the target parameter information includes at least one of information about a first transmission mode, information about an invocation mode, information about a transmission protocol, or information about a second transmission mode, the information about the first transmission mode is an in-band identifier or an out-of-band identifier, the in-band identifier is used to indicate a transmission mode in which invocation information is added to data for transmission between the first device and the second device, the out-of-band identifier is used to indicate a transmission mode in which the data and the invocation information are separately transmitted between the first device and the second device, the invocation mode is one-request-one-response or one-request-multiple-response, the transmission protocol is any one of a Representational State Transfer Application Programming Interface Protocol, an Advanced Message Queue Interface Protocol, a Message Queuing Telemetry Transport Protocol, or a Remote Procedure Call Protocol, and the second transmission mode comprises transmitting information between the first device and the second device directly or using an intermediate node; and receiving, by the second device, the invocation information sent by the first device, where the invocation information is used to invoke the target service.

The second device sends the registration request to the registration center, such that the parameter database of the registration center stores parameter information of a plurality of different services. After receiving a service discovery request, the registration center queries the parameter database for parameter information satisfying a requirement, determines a service corresponding to the parameter information satisfying the requirement, and sends the description information of the service to the first device. In this way, the first device can invoke the service of the second device, and therefore the first device can obtain the service of high quality.

In some possible implementations, when the second transmission mode comprises transmitting the information between the first device and the second device using the intermediate node, the target parameter information further includes a location of the intermediate node. The intermediate node is located on a third-party device, the registration center, or the second device.

If the information about the second transmission mode included in the target parameter information is information indicating that transmission is performed using the intermediate node and that the intermediate node is located at the third-party device, the registration center determines, through searching, description information of the target service corresponding to the parameter information including the information indicating that transmission is performed using the intermediate node and that the intermediate node is located at the third-party device, to obtain the target service of the second device, such that the first device can be provided with the service of high quality.

In some possible implementations, the network service system is a mobile edge computing system. The mobile edge computing system includes a mobile edge orchestrator and a mobile edge host. The mobile edge host includes a mobile edge platform, a first mobile edge application, and a second mobile edge application. The mobile edge platform corresponds to the registration center, the first mobile edge application corresponds to the first device, and the second mobile edge application corresponds to the second device. The mobile edge orchestrator is configured to manage the first mobile edge application and the second mobile edge application.

Among diversified services, a proper service can be found for the first mobile edge application based on application service supporting parameter information. Especially among application services that support a plurality of interface protocols or different invocation modes, the first mobile edge application can select a satisfactory interface protocol or invocation mode for transmitting the invocation information, thereby improving transmission efficiency.

In some possible implementations, the network service system is a services and systems aspects work group 6 system. The services and systems aspects work group 6 system includes a service registration server, a mission-critical service, and an external application. The service registration server corresponds to the registration center, the external application corresponds to the first device, and the mission-critical service corresponds to the second device.

In this way, among diversified services, a proper service can be found for the external application based on service supporting parameter information. Especially, a trusted application or an application in a same domain can directly access the service, whereas an untrusted application or an application in another domain can access the service only after authentication, format conversion, or the like is performed by an intermediate entity. This improves security performance of the network system.

In some possible implementations, the network service system is a services and systems aspects work group 2 system. The services and systems aspects work group 2 system includes a network function repository function, a first network function instance, and a second network function instance. The network function repository function corresponds to the registration center, the first network function instance corresponds to the first device, and the second network function instance corresponds to the second device.

In this way, among diversified services, a proper service can be found for the first network function instance based on service supporting parameter information. Especially, selecting a proper transmission protocol can normalize interface invocation, that is, appropriately allocate an interface to improve the service, thereby enhancing processing efficiency of the network system.

According to a fourth aspect, a registration center is provided, where the registration center includes modules configured to perform the method according to any one of the first aspect or the possible implementations of the first aspect.

According to a fifth aspect, a device is provided, where the device includes modules configured to perform the method according to any one of the second aspect or the possible implementations of the second aspect.

According to a sixth aspect, a device is provided, where the device includes modules configured to perform the method according to any one of the third aspect or the possible implementations of the third aspect.

According to a seventh aspect, a system is provided, where the system includes the registration center according to the fourth aspect, the device according to the fifth aspect, and the device according to the sixth aspect.

According to an eighth aspect, a registration center is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method according to any one of the first aspect or the possible implementations of the first aspect.

According to a ninth aspect, a device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method according to any one of the second aspect or the possible implementations of the second aspect.

According to a tenth aspect, a device is provided, including a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the processor is enabled to perform the method according to any one of the third aspect or the possible implementations of the third aspect.

According to an eleventh aspect, a computer storage medium is provided. The computer storage medium stores program code, and the program code is used to instruct to execute an instruction for performing the service discovery method according to any one of the first aspect or the possible implementations of the first aspect.

According to a twelfth aspect, a computer storage medium is provided. The computer storage medium stores program code, and the program code is used to instruct to execute an instruction for performing the service discovery method according to any one of the second aspect or the possible implementations of the second aspect.

According to a thirteenth aspect, a computer storage medium is provided. The computer storage medium stores program code, and the program code is used to instruct to execute an instruction for performing the service discovery method according to any one of the third aspect or the possible implementations of the third aspect.

Based on the foregoing technical solutions, the registration center receives the service discovery request sent by the first device, where the service discovery request carries the target parameter information of the service needed by the first device, and the target parameter information includes the at least one of the information about the first transmission mode, the information about the invocation mode, the information about the transmission protocol, or the information about the second transmission mode; determines, based on the service parameter database, the target service corresponding to the target parameter information; and sends the service response message including the description information of the target service to the first device. In this way, among diversified services, a proper service can be found for the first device based on service supporting parameter information. Therefore, service quality can be improved, and system processing efficiency can be enhanced.

DESCRIPTION OF EMBODIMENTS

The following describes technical solutions of this application with reference to accompanying drawings.

Figure 1:
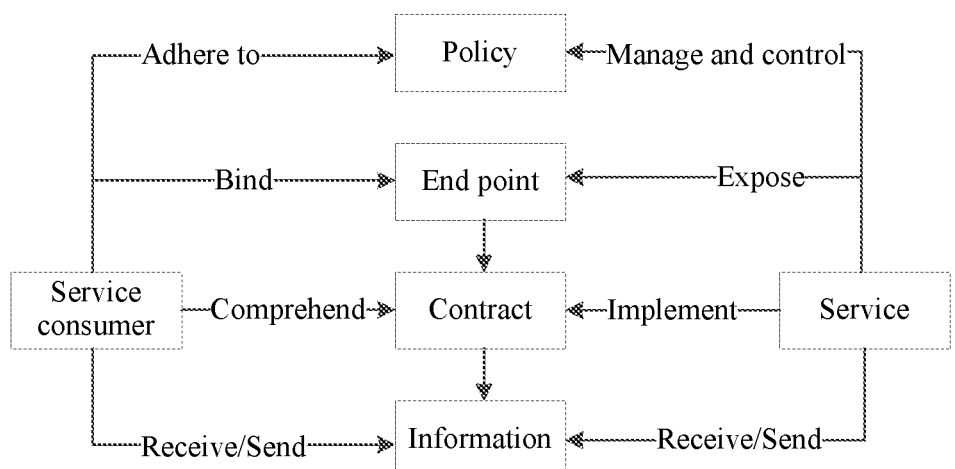
FIG. 1 is an architectural diagram of service registration and discovery.

FIG. 1 is an architectural diagram of service registration and discovery. As shown in FIG. 1, service registration and discovery is a directory service that facilitates a service definition, service selection, and a service execution policy. As a service supplier, a service provider registers service information of the service provider with a service registration center. The service registration center mainly provides central storage for all service registration information, and is responsible for sending a service registration information update notification to a service consumer in real time. The service consumer obtains needed service registration information from the service registration center, and invokes a service.

Various elements in a service registration and discovery system are defined as follows.

A service is a loosely coupled and coarse-grained autonomous component that can independently implement a logical function, and is available for invocation by a service consumer (e.g., an application/a network element or another component).

An end point is a discovery address notified to a service consumer by a service instance, and the service instance uses the address to expose information.

Contracts are agreements to which a service and a server invoker adhere, such as an application programming interface (API) version, a uniform resource identifier (URI) directory, a quantity of parameters, and a message format.

A registration center is used when a plurality of service instances are the same or a service instance needs to be dynamically generated. The service instance may provide an end point and a contract of the service instance for the registration center, such that a service invoker discovers and normally uses the service.

Figure 2:
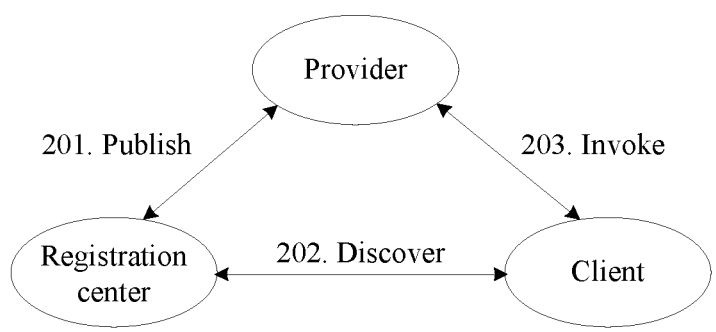
FIG. 2 is a schematic flowchart of network service registration and discovery.

FIG. 2 is a schematic flowchart of network service (e.g., Web Service) registration and discovery.

201. A service provider publishes a provided network service in a registration center. The network service published by the service provider in the registration center may be characteristic information of the network service, such as at least one of a service identity (ID), a service name, a version number, a provider ID, an end point, an interface table, or a supplier.

202. A client discovers a needed network service in the registration center, and specifically the registration center searches for the characteristic information of the network service to find the proper network service.

203. The client obtains an end point of the network service.

Figure 3:
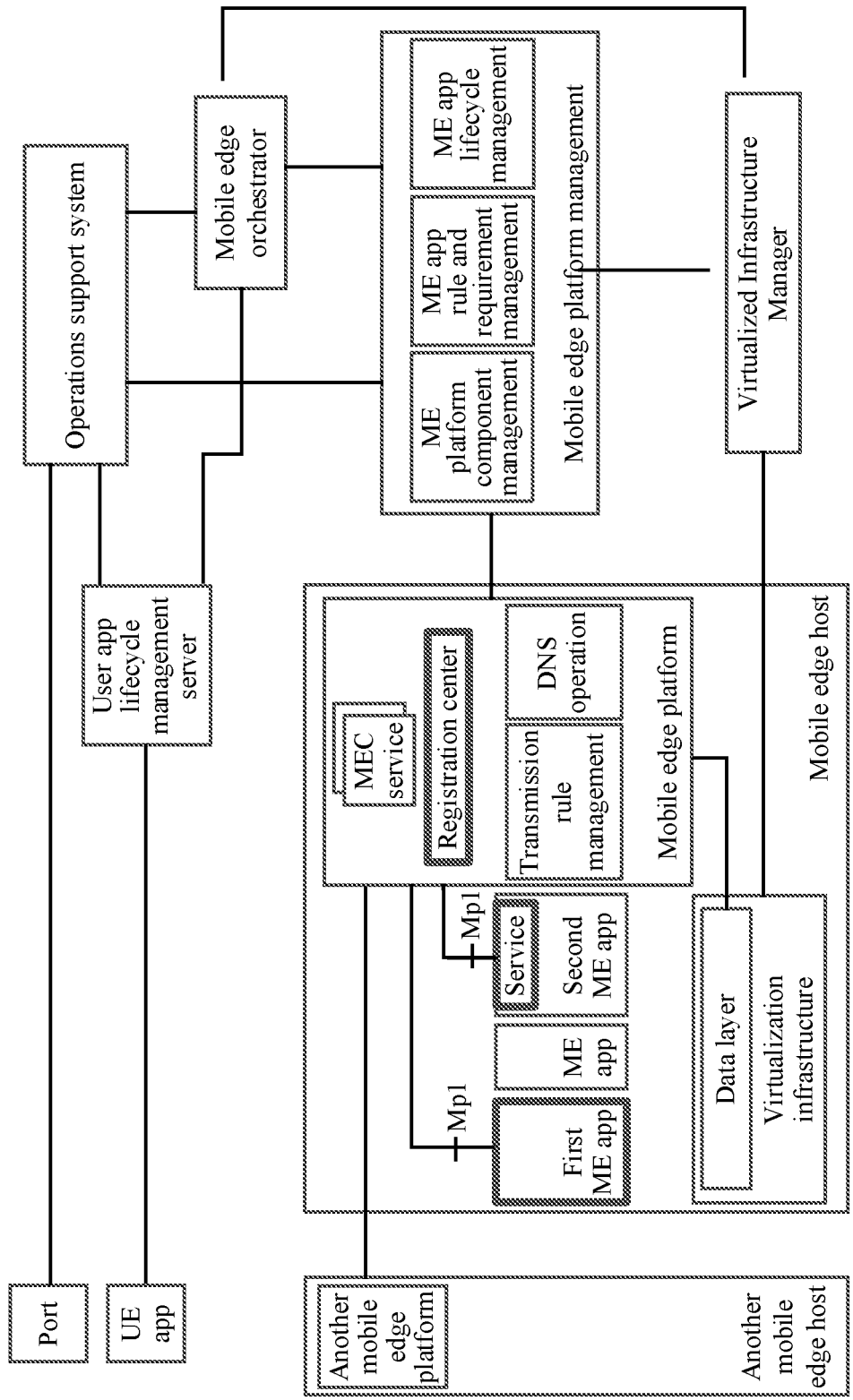
FIG. 3 is a schematic diagram of a scenario in which service registration and discovery is applied to a mobile edge computing (MEC) system.

FIG. 3 shows a scenario in which service registration and discovery is applied to a mobile edge computing (MEC) system. As shown in FIG. 3, the MEC system mainly includes a mobile edge orchestrator (MEO) and a mobile edge host. The MEO has a core management function in the MEC system. The mobile edge host mainly includes a mobile edge platform, a virtualization infrastructure, and a mobile edge (ME) application (ME app).

The mobile edge platform is a set of basic functions, is capable of running the mobile edge application in a virtualization infrastructure, and makes the mobile edge application be capable of providing and using a mobile edge service. The mobile edge application is an application instantiated in the virtualization infrastructure of the mobile edge host based on an MEO configuration or request. The mobile edge application includes a service provider and a service consumer. In addition, a registration center is located on the mobile edge platform, and a service instance may provide an end point and a contract of the service instance for the registration center, such that a service invoker discovers and normally uses the service instance.

An Mp1 interface and a Representational State Transfer (Restful) API are also defined in the MEC. The Mp1 interface supports service registration, service discovery, and service communication between the mobile edge platform and the mobile edge application. RESTful API is an API whose state is continually changed by a client as a representation manner of a network resource is continually obtained. For example, the service provider of the MEC registers a service with the mobile edge platform through the Mp1 interface, the service consumer discovers a service from the mobile edge platform through the Mp1 interface, and the service consumer invokes, through the RESTful application programming interface, the service provided by the service provider.

Figure 4:
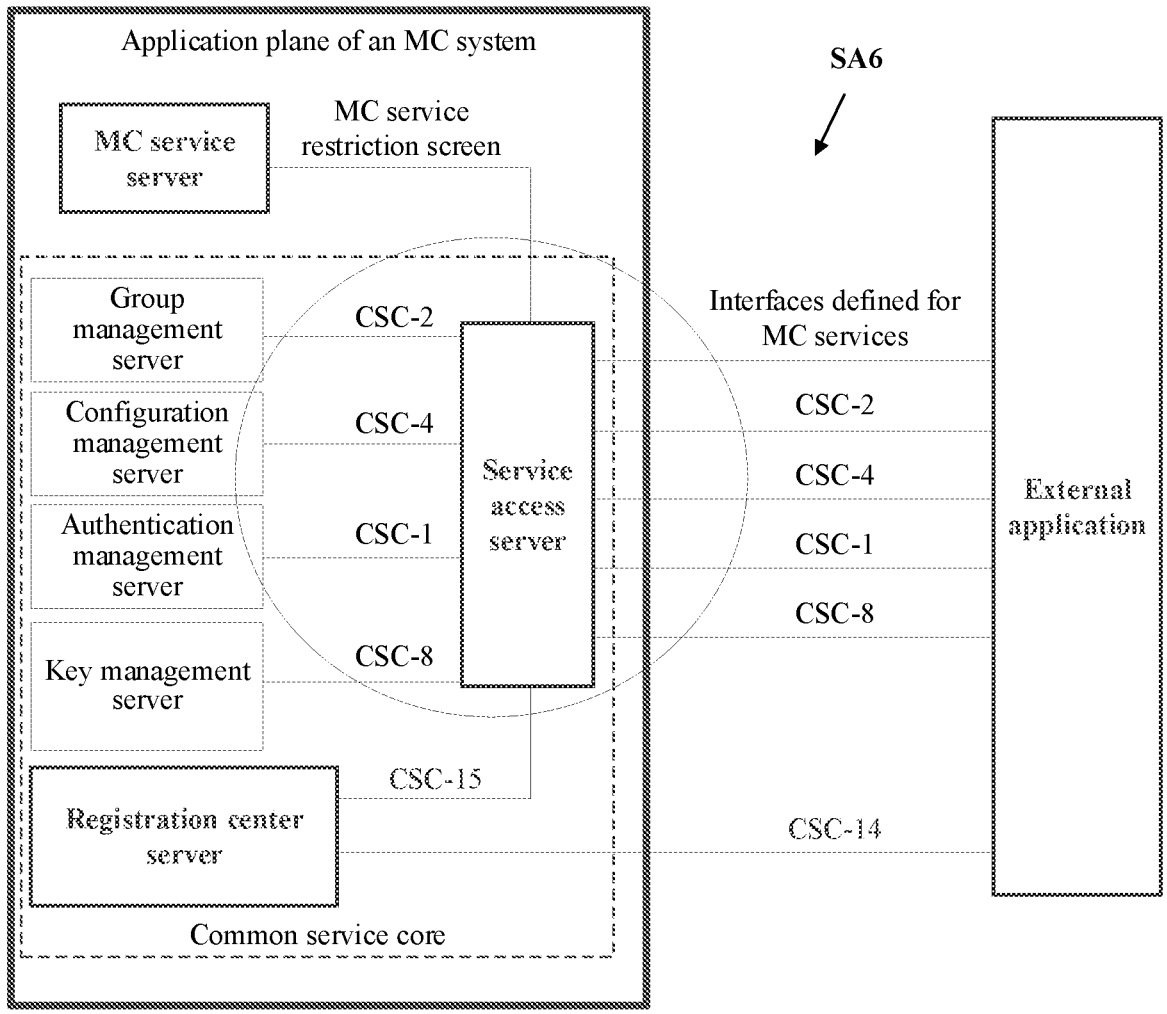
FIG. 4 is a schematic diagram of a scenario in which service registration and discovery is applied to a services and systems aspects (SA) work group 6 system.

FIG. 4 shows a scenario in which service registration and discovery is applied to a services and systems aspects work group (SA) 6 system. As shown in FIG. 4, the SA6 system includes a mission-critical (MC) service (MC Service), a service access server, a common service core (CSC), CSC interfaces CSC-1, CSC-2, CSC-4, CSC-8, CSC-15), an external application, and an operations support system (OSS). The MC service controls exposure of a service capability to the external application using the service access server. The mission-critical service queries for and discovers a service on the service access server, and then implements service communication through a reused interface.

Figure 5:
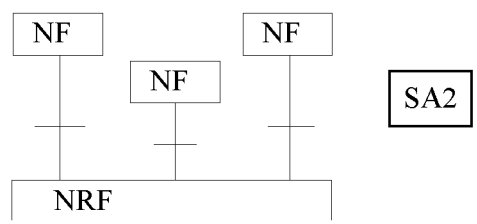
FIG. 5 is a schematic diagram of a scenario in which service registration and discovery is applied to an SA2.

FIG. 5 is a schematic diagram of a scenario in which service registration and discovery is applied to an SA2. As shown in FIG. 5, the SA2 system includes a network function repository function (NRF), a first network function (NF) instance (NFI), a second network function instance, and management and orchestration (MANO). The NRF maintains information about a deployed NFI during deployment, updating, and deletion of the network function instance. The NRF supports a service discovery function, receives a network function discovery request from the NFI, and provides found information about the NFI for the NFI.

To sum up, network service registration and discovery may be applied to the mobile edge computing (MEC) system, the SA6 system, and the SA2 system. The MEC system is used as an example. In a conventional MEC system, a service consumer can only use a RESTful API to invoke a service of a service provider, and therefore the service provider and the discoverer do not need to consider a transmission interface. In other words, in the conventional solution, the service provider and the discoverer use the fixed interface.

In the European Telecommunications Standards Institute (ETSI) MEC #8B meeting, an MEC system not only supports a RESTful API, but also supports a transport-layer service interface used to support transmission with a low latency and a large data volume, for example, a Message Queuing Telemetry Transport (MQTT) protocol, an Advanced Message Queuing Protocol (AMQP), and a private Remote Procedure Call (RPC) Protocol. In contrast, in the conventional technology, a proper service cannot be found based on a requirement for an interface, and consequently service quality is reduced.

Figure 6:
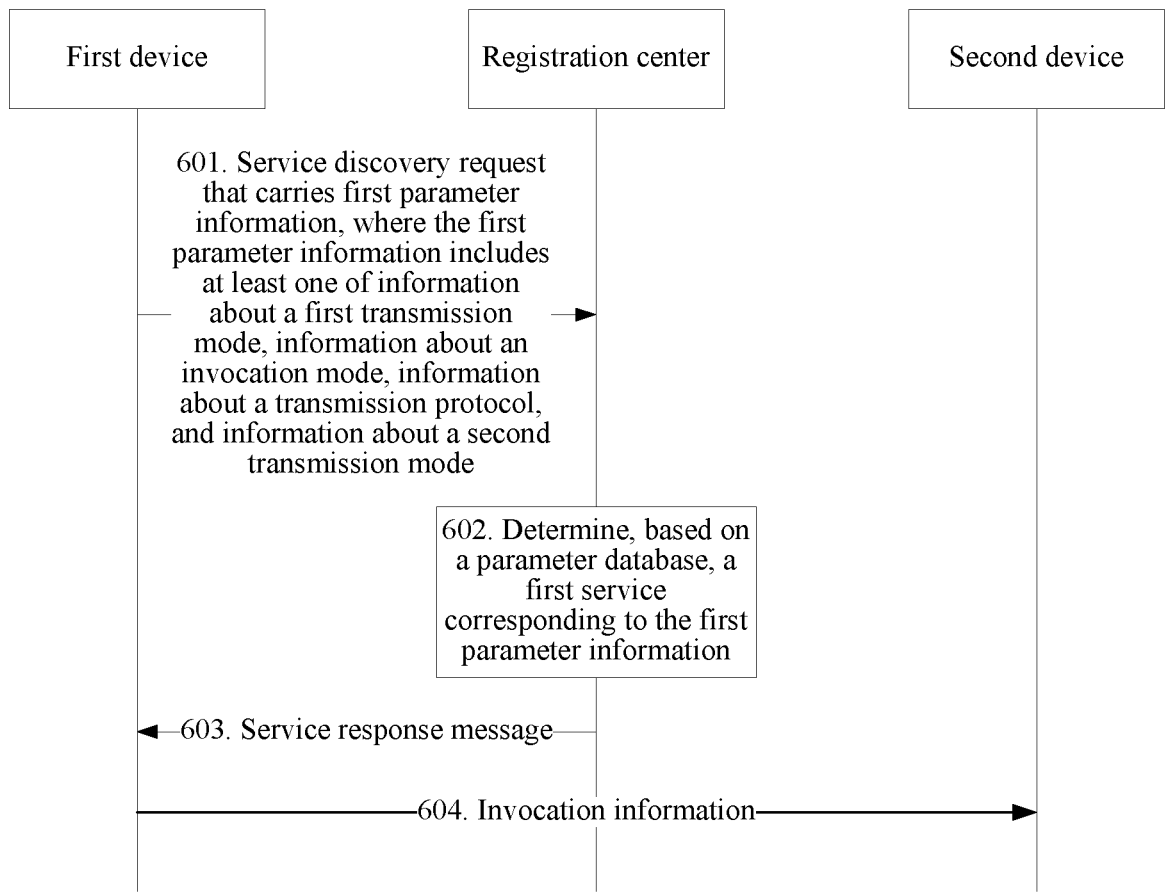
FIG. 6 is a schematic flowchart of a service discovery method according to an embodiment of this application.

FIG. 6 is a schematic flowchart of a service discovery method according to an embodiment of this application. As shown in FIG. 6, the method is applied to a network service system. The network service system includes a registration center, a first device, and a second device. The method includes the following steps.

601. The registration center receives a service discovery request sent by the first device, where the service discovery request carries target parameter information of a service needed by the first device, the target parameter information includes at least one of information about a first transmission mode, information about an invocation mode, information about a transmission protocol, or information about a second transmission mode, the information about the first transmission mode is an in-band identifier or an out-of-band identifier, the in-band identifier is used to indicate a transmission mode in which invocation information is added to data for transmission, the out-of-band identifier is used to indicate a transmission mode in which the data and the invocation information are separately transmitted, the invocation mode is one-request-one-response or one-request-multiple-response, the transmission protocol is any one of a Representational State Transfer Application Programming Interface Protocol, an Advanced Message Queue Interface Protocol, a Message Queuing Telemetry Transport Protocol, or a Remote Procedure Call Protocol, and the second transmission mode is performing transmission directly or using an intermediate node.

602. The registration center determines, based on a service parameter database, a target service corresponding to the target parameter information, where the service parameter database is used to store parameter information of different services of the second device.

603. The registration center sends a service response message to the first device, where the service response message includes description information of the target service.

604. The first device sends the invocation information to the second device, where the invocation information is used to invoke the target service.

The first device sends the service discovery request to the registration center, where the service discovery request is used to request the service, provided by the second device, corresponding to the target parameter information, and the service discovery request carries the target parameter information. The service parameter database stores the parameter information of the different services of the second device, and all the services are in one-to-one correspondence to parameter information. Description information of each service corresponding to parameter information may be an ID of the service. After receiving the service discovery request, the registration center searches the service parameter database for the target service satisfying the target parameter information, and sends the service response message including the description information of the target service to the first device, such that the first device can send the invocation information based on the description information of the target service, to invoke the target service of the second device. In other words, a needed service can be selected more accurately for the first device in this embodiment of this application, thereby improving service quality.

The target parameter information of the service needed by the first device may be parameter information corresponding to the service needed by the first device. For example, the target parameter information may be the information about the first transmission mode, the information about the invocation mode, the information about the transmission protocol, the information about the second transmission mode, or the like that is used when the first device sends the invocation information to the second device after selecting the target service and receives a response message sent by the second device based on the invocation information.

It should be noted that the service discovery request sent by the first device to the registration center may further carry at least one of a service ID, a service name, a version number, a provider ID, an end point, an interface table, or a supplier.

It should be understood that a correspondence between a service and parameter information may be represented using a mapping relationship, in another form, or the like. This is not limited in this application.

It should also be understood that in the service parameter database, each service corresponds to one piece of parameter information, and the parameter information also includes the at least one of the information about the first transmission mode, the information about the invocation mode, the information about the transmission protocol, or the information about the second transmission mode.

It should also be understood that the first device may be a hardware device or a software application, and the second device may be a hardware device or a software application. In addition, the first device may be the same as the second device. This is not limited in this application.

To sum up, according to the service discovery method in this embodiment of this application, the registration center receives the service discovery request sent by the first device, where the service discovery request carries the target parameter information of the service needed by the first device, and the target parameter information includes the at least one of the information about the first transmission mode, the information about the invocation mode, the information about the transmission protocol, or the information about the second transmission mode; determines, based on the service parameter database, the target service corresponding to the target parameter information; and sends the service response message including the description information of the target service to the first device. In this way, among diversified services, a proper service can be found for the first device based on service supporting parameter information. Therefore, service quality can be improved, and system processing efficiency can be enhanced. In addition, according to the service discovery method in this embodiment of this application, management and extension of the network system can be facilitated.

Optionally, the registration center may receive a registration request, where the registration request includes parameter information of a first service of the second device. The registration center stores the parameter information of the first service into the service parameter database. The first service may be any one of services supported by the second device. For example, the registration center may store parameter information of a plurality of different services into the parameter database; and after receiving the service discovery request, query the parameter database for parameter information satisfying a requirement, and determine a service corresponding to the parameter information satisfying the requirement.

It should be noted that, when the second device sends the registration request to the registration center, the parameter information included in the registration request is the same as the parameter information included in the service discovery request, and also includes the at least one of the information about the first transmission mode, the information about the invocation mode, the information about the transmission protocol, or the information about the second transmission mode, the information about the first transmission mode is the in-band identifier or the out-of-band identifier, the in-band identifier is used to indicate the transmission mode in which the invocation information is added to the data for transmission, the out-of-band identifier is used to indicate the transmission mode in which the data and the invocation information are separately transmitted, the invocation mode is the one-request-one-response or the one-request-multiple-response, the transmission protocol is any one of the Representational State Transfer Application Programming Interface Protocol, the Advanced Message Queue Interface Protocol, the Message Queuing Telemetry Transport Protocol, or the Remote Procedure Call Protocol, and the second transmission mode comprises performing transmission directly or using the intermediate node.

It should be understood that the registration request may further carry at least one of a service ID, a service name, a version number, a provider ID, an end point, an interface table, or a supplier.

Optionally, if the target parameter information includes the information about the first transmission mode, the information about the first transmission mode may be the out-of-band identifier or the in-band identifier. The in-band identifier is used to indicate the transmission mode in which the invocation information is added to the data for transmission, and the out-of-band identifier is used to indicate the transmission mode in which the data and the invocation information are separately transmitted. If the information about the first transmission mode included in the target parameter information is the in-band identifier, the registration center determines a service corresponding to parameter information that is in the service parameter database and that includes the in-band identifier, as the target service. Likewise, if the information about the first transmission mode included in the target parameter information is the out-of-band identifier, the registration center determines a service corresponding to parameter information that is in the service parameter database and that includes the out-of-band identifier, as the target service.

Figure 7:
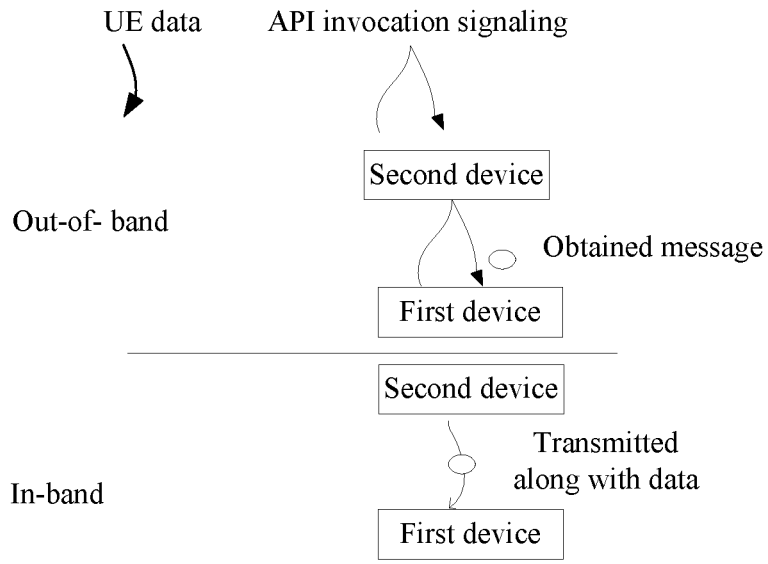
FIG. 7 is a schematic diagram of a transmission mode according to an embodiment of this application.

If the information about the first transmission mode included in the target parameter information is the in-band identifier, the invocation information to be sent by the first device to the second device may be added to the data for transmission, for example, using a Transmission Control Protocol (TCP) option. As shown in FIG. 7, if the information about the first transmission mode included in the target parameter information is the out-of-band identifier, the invocation information and the data that are sent by the first device to the second device may be separately transmitted. The registration center selects, for the first device, the second device satisfying the requirement, such that the first device can obtain the service of high quality.

Figure 8:
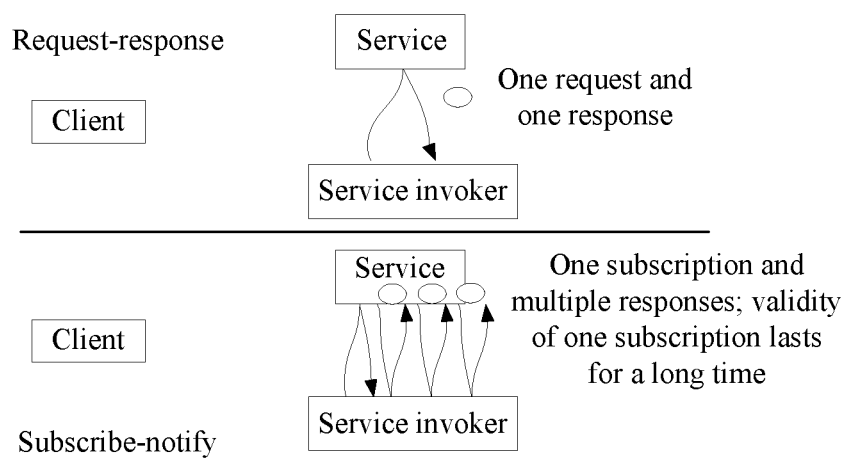
FIG. 8 is a schematic diagram of an invocation mode according to an embodiment of this application.

Optionally, as shown in FIG. 8, the target parameter information may include the information about the invocation mode, where the invocation mode is the one-request-one-response or the one-request-multiple-response. The one-request-one-response may be a service that, after the first device sends invocation information to the second device once, the second device responds to an invocation information request once. In this way, services in need of different contracts can be handled separately, thereby enhancing processing efficiency. The one-request-multiple-response may be a service that, after the first device sends invocation information to the second device once, the second device may respond to an invocation information request a plurality of times, that is, validity of one subscription lasts for a long time. This avoids sending the invocation information a plurality of times between devices that need a same service, thereby reducing power consumption of the first device.

If the invocation mode is the one-request-one-response, the registration center determines a service corresponding to parameter information that is in the service parameter database and that includes information about the one-request-one-response, as the target service. Likewise, if the invocation mode is the one-request-multiple-response, the registration center determines a service corresponding to parameter information that is in the service parameter database and that includes information about the one-request-multiple-response, as the target service.

Figure 9:
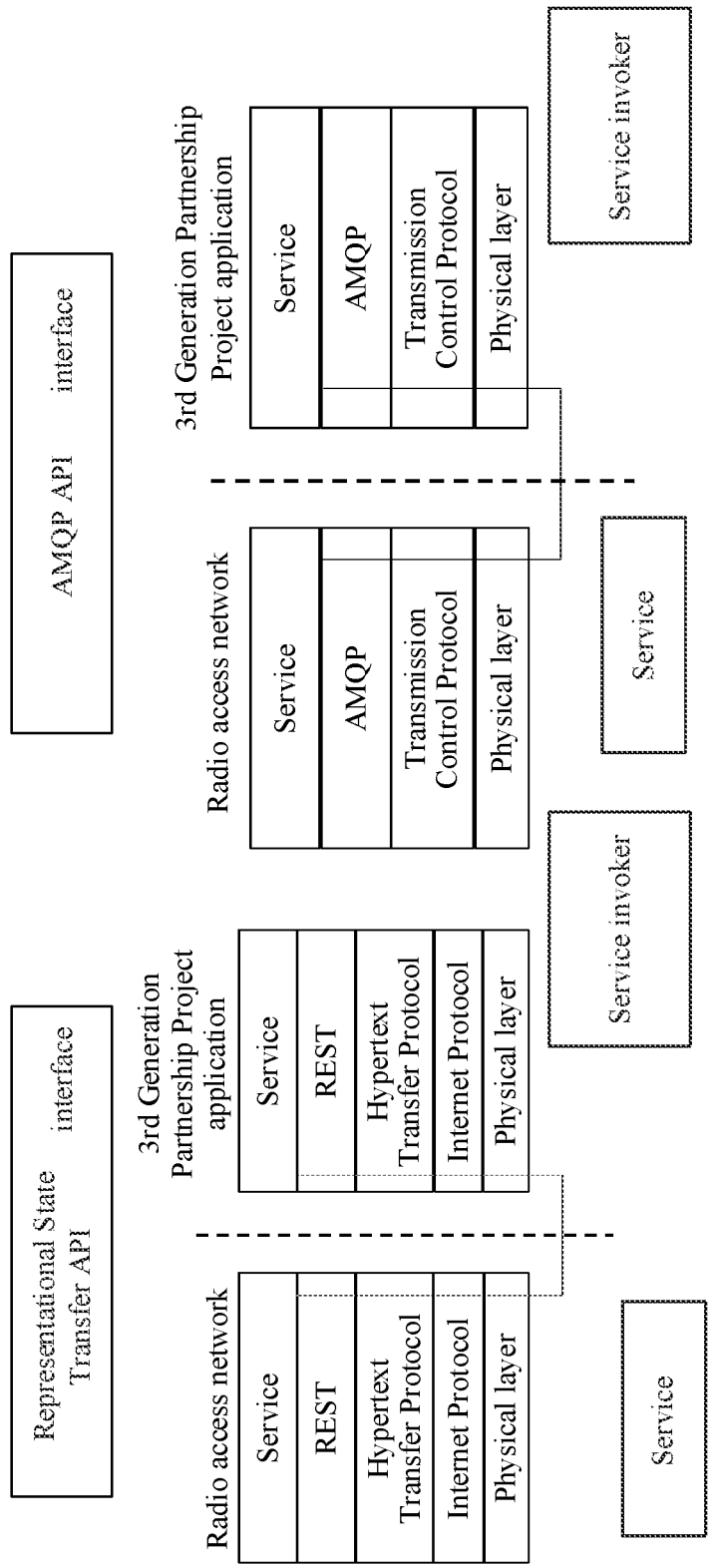
FIG. 9 is a schematic diagram of a transmission protocol according to an embodiment of this application.

Optionally, the target parameter information includes the information about the transmission protocol, where the transmission protocol is any one of the RESTful API protocol, the AMQP, the MQTT protocol, or the RPC protocol. FIG. 9 is a schematic diagram of a RESTful API protocol and an AMQP protocol. If the transmission protocol is the AMQP protocol, the registration center determines a service corresponding to parameter information that is in the service parameter database and that includes information about the AMQP protocol, as the target service. Likewise, if the transmission protocol is any one of the RESTful API protocol, the MQTT protocol, or the RPC protocol, the registration center determines a service corresponding to parameter information that is in the service parameter database and that includes information about the corresponding interface protocol, as the target service.

Figure 10:
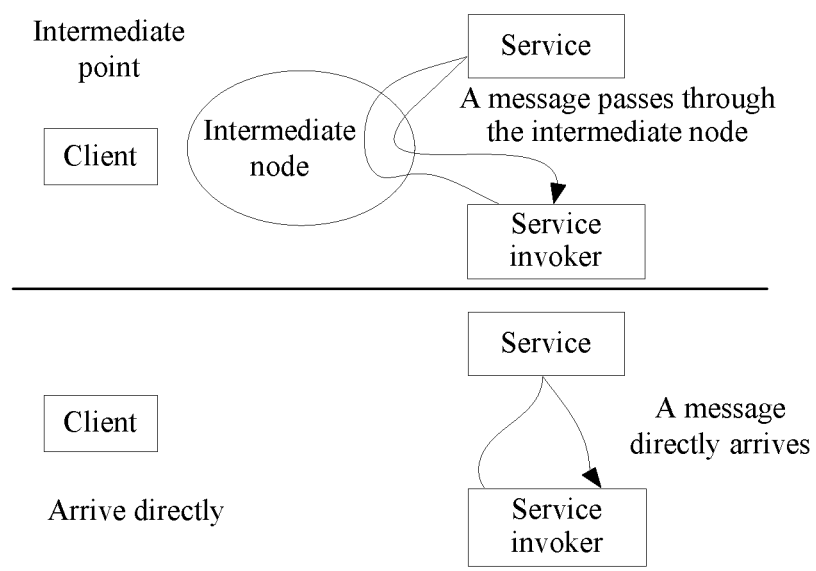
FIG. 10 is a schematic diagram of a transmission mode according to an embodiment of this application.

Optionally, the target parameter information includes the information about the second transmission mode. As shown in FIG. 10, the second transmission mode is performing transmission directly or using an intermediate node. If the second transmission mode is performing transmission directly, the registration center determines a service corresponding to parameter information that is in the service parameter database and that includes information indicating that transmission is performed directly, as the target service. Likewise, if the second transmission mode is performing transmission using the intermediate node, the registration center determines a service corresponding to parameter information that is in the service parameter database and that includes information indicating that transmission is performed using the intermediate node, as the target service. In this way, the second device can allow a first device corresponding to a trusted application or an application in a same domain to directly access the service, but allow a first device corresponding to an untrusted application or an application in another domain to access the service only after authentication or message format conversion is performed by an intermediate entity. This improves security performance of the second device.

Figure 11:
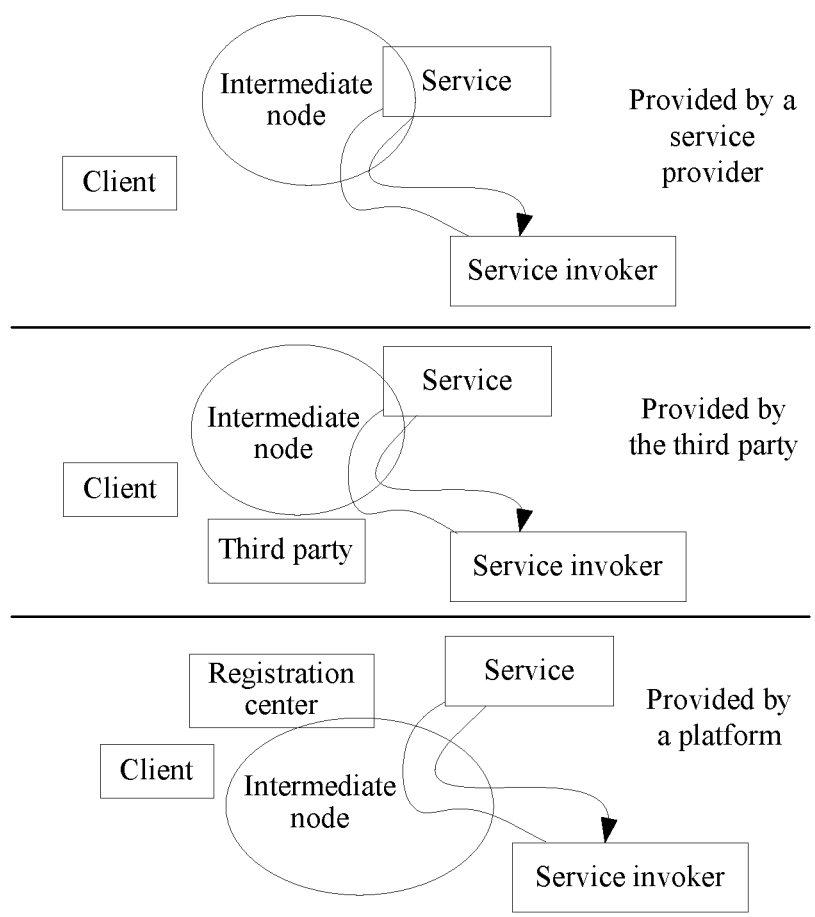
FIG. 11 is a schematic diagram of a location of an intermediate node according to an embodiment of this application.

Optionally, the target parameter information further includes a location of the intermediate node, and as shown in FIG. 11, the intermediate node is located on a third-party device, the registration center, or the second device. The determining, by the registration center when the second transmission mode is performing transmission using the intermediate node, a service corresponding to parameter information that is in the service parameter database and that includes information indicating that transmission is performed using the intermediate node, as the target service may be: determining, by the registration center when the second transmission mode is performing transmission using the intermediate node and the intermediate node is located at the third-party device, a service corresponding to parameter information that is in the service parameter database and that includes information indicating that transmission is performed using the intermediate node and that the intermediate node is located at the third-party device, as the target service.

It should be noted that, when the target parameter information includes at least two of the information about the first transmission mode, the information about the invocation mode, the information about the transmission protocol, and the information about the second transmission mode, the registration center may determine any one of services corresponding to all information that is in the service parameter database and that is included in the target parameter information, as the target service. Alternatively, the registration center may determine a service with a higher proportion among services corresponding to all information, as the target service. The system may preset a rule for the registration center to determine a target service. This is not limited in this application.

Optionally, the network service system is a mobile edge computing MEC system, which includes a mobile edge orchestrator and a mobile edge host. The mobile edge host includes a mobile edge platform, a first mobile edge application, and a second mobile edge application. The mobile edge platform corresponds to the registration center, the first mobile edge application corresponds to the first device, and the second mobile edge application corresponds to the second device. The mobile edge orchestrator is configured to manage the first mobile edge application and the second mobile edge application.

For example, the first mobile edge application may select different interface protocols such as the MQTT protocol, the AMQP, and the private Remote Procedure Call (RPC) Protocol. In other words, a proper service is found based on a requirement for an interface protocol, thereby improving service quality.

Optionally, the network service system is an SA6 system. The SA6 system includes a service registration server, a mission-critical service, and an external application. The service registration server corresponds to the registration center, the external application corresponds to the first device, and the mission-critical service corresponds to the second device.

In the SA6, the external application located in a trusted domain different from that of the mission-critical service uses a service access server. In this case, a service is used to implement an application for users in different trusted domains/deployment domains. A trusted application or an application in a same domain can directly access the service, whereas an untrusted application or an application in another domain can access the service only after authentication or message format conversion is performed by an intermediate entity.

Optionally, the network service system is an SA2 system. The SA2 system includes a network function repository function, a first network function instance, and a second network function instance. The network function repository function corresponds to the registration center, the first network function instance corresponds to the first device, and the second network function instance corresponds to the second device.

In the SA2, an attribute of a network function (NF) is the same as an attribute of a service, and there may be a one-to-one mapping relationship between the network function and the service. The NF may be targeted for a third party and a network element in a visited public land mobile network (VPLMN), or may be targeted for a network element in a home public land mobile network (HPLMN), and interfaces and message obtaining manners may be different. For example, in an evolved packet system (EPS), a message obtaining procedure for an S5 interface between a serving gateway (S-GW) and an H-packet data gateway (PGW) is different from a message obtaining procedure for an S8 interface between an S-GW and a V-PGW. A network exposure function (NEF) is targeted for an internal network element and a third party in the future, and interfaces and message obtaining manners may also be different. In this way, a proper second network function instance can be selected for the first network function instance more accurately based on the parameter information, thereby improving service quality.

To sum up, according to the service discovery method in this embodiment of this application, the registration center receives the service discovery request sent by the first device, where the service discovery request carries the target parameter information of the service needed by the first device, and the target parameter information includes the at least one of the information about the first transmission mode, the information about the invocation mode, the information about the transmission protocol, or the information about the second transmission mode; determines, based on the service parameter database, the target service corresponding to the target parameter information; and sends the service response message including the description information of the target service to the first device. In this way, among diversified services, a proper service can be found for the first device based on service supporting parameter information. Therefore, service quality can be improved, and system processing efficiency can be enhanced.

Figure 12:
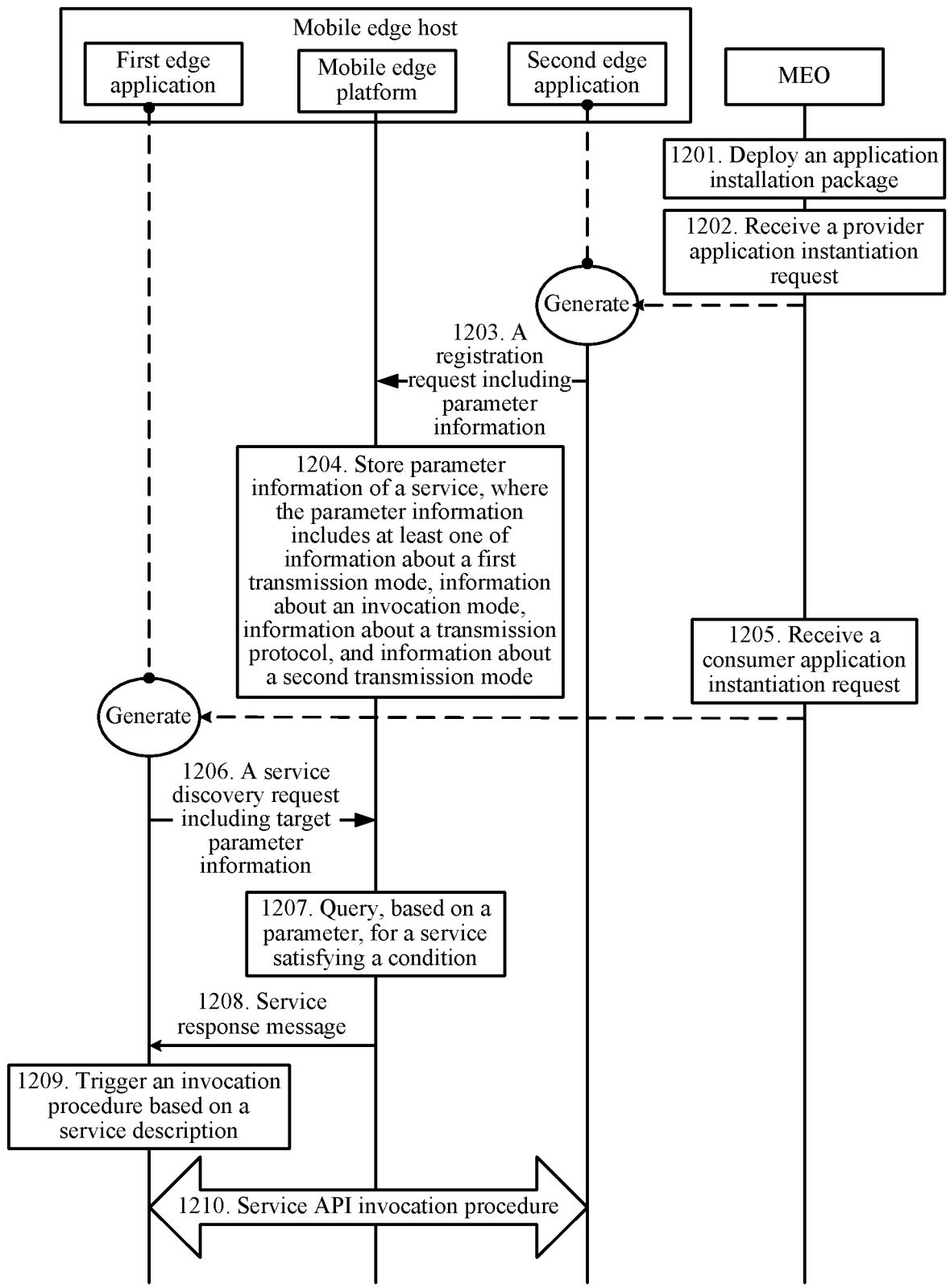
FIG. 12 is a schematic diagram of an interaction procedure of a service discovery method according to an embodiment of this application.

FIG. 12 is a schematic diagram of an interaction procedure of a service discovery method according to an embodiment of this application. Various same terms in this embodiment have same meanings as those in the foregoing embodiments.

The method may be applied to the MEC system shown in FIG. 3. A registration center may be corresponding to a mobile edge platform or may be an independent apparatus located on a mobile edge platform of a mobile edge host. A first device may be corresponding to a first mobile edge application, in the mobile edge host, used to request a service. A second device may be corresponding to a second mobile edge application, in the mobile edge host, used to provide a service. In other words, the first mobile edge application is a "service consumer", and the second mobile edge application is a "service provider".

An application developer may implement two applications according to an agreement (for example, a development manual or the 3rd Generation Partnership Project (3GPP) standard): implement an interface in the agreement, and invoke a related interface function according to the agreement. Before implementing this embodiment of this application, the MEC system deploys the two applications on devices in the MEC system using an MEO.

1201. The MEO deploys a mission-critical service application installation package, including an application resource requirement, an application file, a needed-service description, and the like.

1202. After receiving an application instantiation request, the MEO controls the application installation package to generate a provider application instance, that is, a service that can be provided, in the second mobile edge application.

1203. The second mobile edge application sends a registration request to the mobile edge platform, where the registration request includes service supporting parameter information.

For example, the parameter information includes at least one of information about a first transmission mode, information about an invocation mode, information about a transmission protocol, or information about a second transmission mode. The information about the first transmission mode is an in-band identifier or an out-of-band identifier. The in-band identifier is used to indicate a transmission mode in which invocation information is added to data for transmission, while the out-of-band identifier is used to indicate a transmission mode in which the data and the invocation information are separately transmitted. The invocation mode is one-request-one-response or one-request-multiple-response. The transmission protocol is any one of a Representational State Transfer Application Programming Interface Protocol, an Advanced Message Queue Interface Protocol, a Message Queuing Telemetry Transport Protocol, or a Remote Procedure Call Protocol. Further, the second transmission mode is performing transmission directly or using an intermediate node.

1204. The mobile edge platform stores the service and the parameter information of the service into a service parameter database. For example, the parameter information includes at least one of information about a first transmission mode, information about an invocation mode, information about a transmission protocol, or information about a second transmission mode.

Because registration requests may be sent to the mobile edge platform for different services, the service parameter database stores a plurality of different services and parameter information corresponding to the services.

1205. After receiving a consumer application instantiation request, the MEO may control the application installation package to generate a consumer application instance, that is, a needed service, in the first mobile edge application.

It should be understood that if the mobile edge platform has stored the parameter information of the different services, step 1205 may be directly performed, and steps 1201 to 1204 do not need to be performed.

1206. The first mobile edge application sends a service discovery request to the mobile edge platform, where the service discovery request includes parameter information of the needed service, and the parameter information may be represented as target parameter information. For example, the target parameter information also includes the at least one of the information about the first transmission mode, the information about the invocation mode, the information about the transmission protocol, or the information about the second transmission mode.

1207. The mobile edge platform determines, based on the parameter information of the service stored in the service parameter database, a target service satisfying the target parameter information.

1208. The mobile edge platform sends a service response message to the first mobile edge application, where the service response message includes description information of the target service.

1209. The first mobile edge application triggers an invocation procedure based on the service response message.

1210. The first mobile edge application performs the invocation procedure based on the description information of the target service in the service response message.

For example, the invocation information may be sent to the second mobile edge application, to invoke the target service in the second mobile edge application. The invocation procedure includes, for example, preparing a to-be-requested resource, storing a context, querying for the context, and returning content or a result of invocation.

To sum up, according to the service discovery method in this embodiment of this application, the mobile edge platform receives the service discovery request sent by the first mobile edge application, where the service discovery request carries the target parameter information of the service needed by the first mobile edge application, and the target parameter information includes the at least one of the information about the first transmission mode, the information about the invocation mode, the information about the transmission protocol, or the information about the second transmission mode; determines, based on the service parameter database, the target service corresponding to the target parameter information; and sends the service response message including the description information of the target service to the first mobile edge application. In this way, among diversified services, a proper service can be found for the first mobile edge application based on application service supporting parameter information. Especially among application services that support a plurality of interface protocols or different invocation modes, the first mobile edge application can select a satisfactory interface protocol and invocation mode for transmitting the invocation information, thereby improving transmission efficiency.

Figure 13:
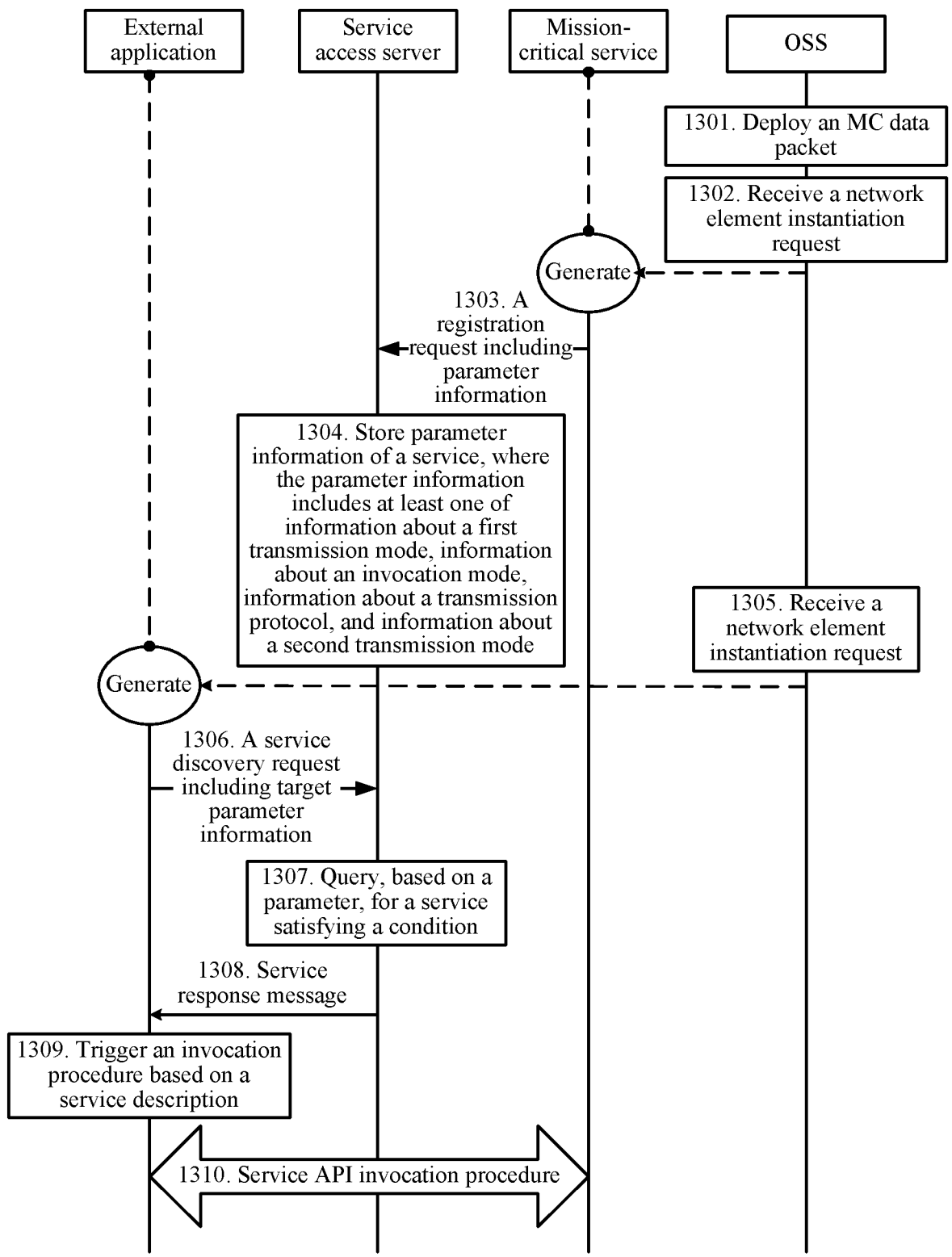
FIG. 13 is a schematic diagram of an interaction procedure of a service discovery method according to another embodiment of this application.

FIG. 13 is a schematic diagram of an interaction procedure of a service discovery method according to another embodiment of this application. Various same terms in this embodiment have same meanings as those in the foregoing embodiments.

The method may be applied to the SA6 system shown in FIG. 4. A registration center may be corresponding to a service access server, a first device may be corresponding to an external application used to request a service, and a second device may be corresponding to a mission-critical service used to provide a service. In other words, the external application is a "service consumer", and the mission-critical service is a "service provider".

An application developer may implement two applications according to an agreement (for example, a development manual or the 3GPP standard): implement an interface in the agreement, and invoke a related interface function according to the agreement. Before implementing this embodiment of this application, the SA6 system deploys the two applications on devices in the SA6 system using an OSS.

1301. The OSS deploys a mission-critical service installation package (MC package).

1302. After receiving an application instantiation request, the OSS controls the application installation package to generate a provider application instance, that is, a service that can be provided, in the mission-critical service.

1303. The mission-critical service sends a registration request to the service access server, where the registration request includes service supporting parameter information.

For example, the parameter information includes at least one of information about a first transmission mode, information about an invocation mode, information about a transmission protocol, or information about a second transmission mode, the information about the first transmission mode is an in-band identifier or an out-of-band identifier, the in-band identifier is used to indicate a transmission mode in which invocation information is added to data for transmission, the out-of-band identifier is used to indicate a transmission mode in which the data and the invocation information are separately transmitted, the invocation mode is one-request-one-response or one-request-multiple-response, the transmission protocol is any one of a Representational State Transfer Application Programming Interface Protocol, an Advanced Message Queue Interface Protocol, a Message Queuing Telemetry Transport Protocol, or a Remote Procedure Call Protocol, and the second transmission mode comprises performing transmission directly or using an intermediate node.

1304. The service access server stores the service and the parameter information of the service into a service parameter database. For example, the parameter information includes at least one of information about a first transmission mode, information about an invocation mode, information about a transmission protocol, or information about a second transmission mode.

Because registration requests may be sent to the service access server for different services, the service parameter database stores a plurality of different services and parameter information corresponding to the services.

1305. After receiving a consumer application instantiation request, the OSS may control the application installation package to generate a consumer application instance, that is, a needed service, in the external application.

It should be understood that if the service access server has stored the parameter information of the different services, step 1305 may be directly performed, and steps 1301 to 1304 do not need to be performed.

1306. The external application sends a service discovery request to the service access server, where the service discovery request includes parameter information of the needed service, and the parameter information may be represented as target parameter information. For example, the target parameter information also includes the at least one of the information about the first transmission mode, the information about the invocation mode, the information about the transmission protocol, or the information about the second transmission mode.

1307. The service access server determines, based on the parameter information of the service stored in the service parameter database, a target service satisfying the target parameter information.

1308. The service access server sends a service response message to the external application, where the service response message includes description information of the target service.

1309. The external application triggers an invocation procedure based on the service response message.

1310. The external application performs the invocation procedure based on the description information of the target service in the service response message.

The invocation information may be sent to the mission-critical service, to invoke the target service in the mission-critical service. The invocation procedure includes, for example, preparing a to-be-requested resource, storing a context, querying for the context, and returning content or a result of invocation.

To sum up, according to the service discovery method in this embodiment of this application, the service access server receives the service discovery request sent by the external application, where the service discovery request carries the target parameter information of the service needed by the external application, and the target parameter information includes the at least one of the information about the first transmission mode, the information about the invocation mode, the information about the transmission protocol, or the information about the second transmission mode; determines, based on the service parameter database, the target service corresponding to the target parameter information; and sends the service response message including the description information of the target service to the external application. In this way, among diversified services, a proper service can be found for the external application based on service supporting parameter information. Especially, a trusted application or an application in a same domain can directly access the service, whereas an untrusted application or an application in another domain can access the service only after authentication, format conversion, or the like is performed by an intermediate entity. This improves security performance of the network system.

Figure 14:
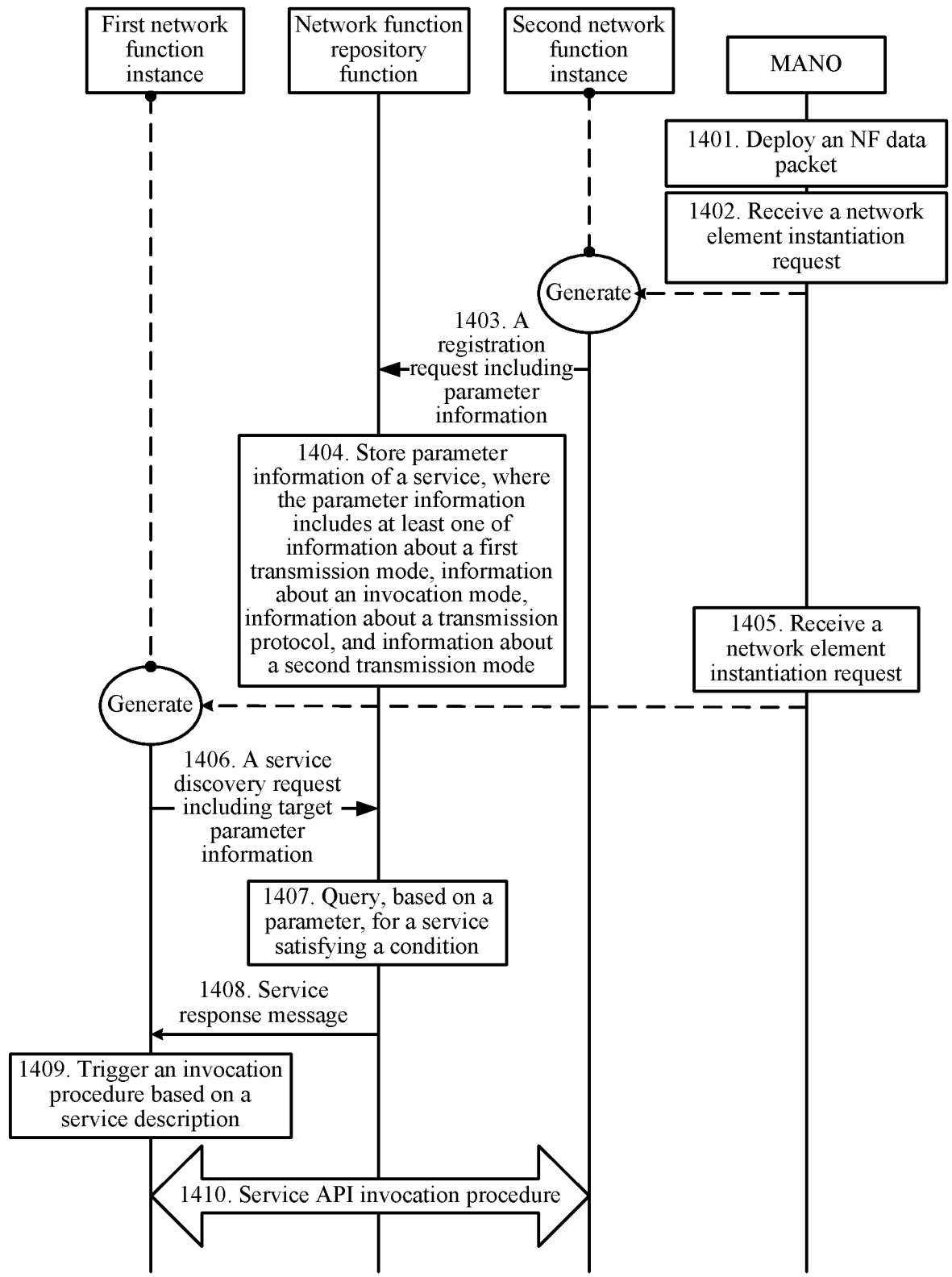
FIG. 14 is a schematic diagram of an interaction procedure of a service discovery method according to another embodiment of this application.

FIG. 14 is a schematic diagram of an interaction procedure of a service discovery method according to an embodiment of this application. Various same terms in this embodiment have same meanings as those in the foregoing embodiments.

The method may be applied to the SA2 system shown in FIG. 5. A registration center may be corresponding to a network function repository function, a first device may be corresponding to a first network function instance used to request a service, and a second device may be corresponding to a second network function instance used to provide a service. In other words, the first network function instance is a "service consumer", and the second network function instance is a "service provider".

An application developer may implement two applications according to an agreement (for example, a development manual or the 3GPP standard): implement an interface in the agreement, and invoke a related interface function according to the agreement. Before implementing this embodiment of this application, the SA2 system deploys the two applications on devices in the SA2 system using MANO.

1401. The MANO deploys a network function installation package (NF package).

1402. After receiving an application initiation request, the MANO controls the application installation package to generate a provider application instance, that is, a service that can be provided, in the second network function instance.

1403. The second network function instance sends a registration request to the network function repository function, where the registration request includes service supporting parameter information.

The parameter information includes at least one of information about a first transmission mode, information about an invocation mode, information about a transmission protocol, or information about a second transmission mode, the information about the first transmission mode is an in-band identifier or an out-of-band identifier, the in-band identifier is used to indicate a transmission mode in which invocation information is added to data for transmission, the out-of-band identifier is used to indicate a transmission mode in which the data and the invocation information are separately transmitted, the invocation mode is one-request-one-response or one-request-multiple-response, the transmission protocol is any one of a Representational State Transfer Application Programming Interface Protocol, an Advanced Message Queue Interface Protocol, a Message Queuing Telemetry Transport Protocol, or a Remote Procedure Call Protocol, and the second transmission mode comprises performing transmission directly or using an intermediate node.

1404. The network function repository function stores the service and the parameter information of the service into a service parameter database. For example, the parameter information includes at least one of information about a first transmission mode, information about an invocation mode, information about a transmission protocol, or information about a second transmission mode.

Because registration requests may be sent to the network function repository function for different services, the service parameter database stores a plurality of different services and parameter information corresponding to the services.

1405. After receiving a consumer application instantiation request, the MANO may control the application installation package to generate a consumer application instance, that is, a needed service, in the first network function instance.

It should be understood that if the network function repository function has stored the parameter information of the different services, step 1405 may be directly performed, and steps 1401 to 1404 do not need to be performed.

1406. The first network function instance sends a service discovery request to the network function repository function, where the service discovery request includes parameter information of the needed service, and the parameter information may be represented as target parameter information. For example, the target parameter information also includes the at least one of the information about the first transmission mode, the information about the invocation mode, the information about the transmission protocol, or the information about the second transmission mode.

1407. The network function repository function determines, based on the parameter information of the service stored in the service parameter database, a target service satisfying the target parameter information.

1408. The network function repository function sends a service response message to the first network function instance, where the service response message includes description information of the target service.

1409. The first network function instance triggers an invocation procedure based on the service response message.

1410. The first network function instance performs the invocation procedure based on the description information of the target service in the service response message.

The invocation information may be sent to the second network function instance, to invoke the target service in the second network function instance. The invocation procedure includes, for example, preparing a to-be-requested resource, storing a context, querying for the context, and returning content or a result of invocation.

To sum up, according to the service discovery method in this embodiment of this application, the network function repository function receives the service discovery request sent by the first network function instance, where the service discovery request carries the target parameter information of the service needed by the first network function instance, and the target parameter information includes the at least one of the information about the first transmission mode, the information about the invocation mode, the information about the transmission protocol, or the information about the second transmission mode; determines, based on the service parameter database, the target service corresponding to the target parameter information; and sends the service response message including the description information of the target service to the first network function instance. In this way, among diversified services, a proper service can be found for the first network function instance based on service supporting parameter information. Especially, selecting a proper transmission protocol can normalize interface invocation, that is, appropriately allocate an interface to improve the service, thereby enhancing processing efficiency of the network system.

The foregoing details the service discovery methods according to the embodiments of this application, and the following describes service discovery devices according to embodiments of this application.

Figure 15:
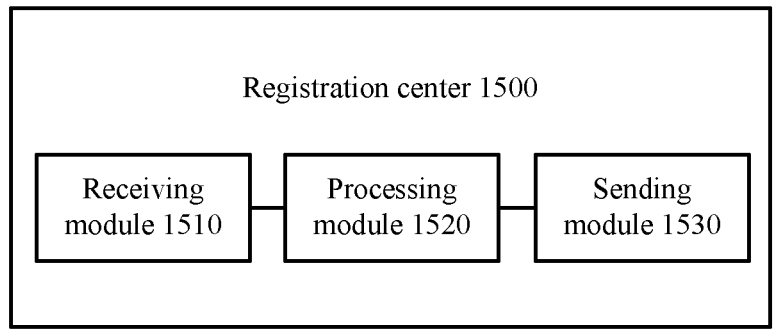
FIG. 15 is a schematic block diagram of a registration center according to an embodiment of this application.

FIG. 15 is a schematic block diagram of a registration center 1500 according to an embodiment of this application. As shown in FIG. 15, the registration center 1500 includes: a receiving module 1510 configured to receive a service discovery request sent by a first device, where the service discovery request carries target parameter information of a service needed by the first device, the target parameter information includes at least one of information about a first transmission mode, information about an invocation mode, information about a transmission protocol, or information about a second transmission mode, the information about the first transmission mode is an in-band identifier or an out-of-band identifier, the in-band identifier is used to indicate a transmission mode in which invocation information is added to data for transmission between the first device and a second device, the out-of-band identifier is used to indicate a transmission mode in which the data and the invocation information are separately transmitted between the first device and the second device, the invocation mode is one-request-one-response or one-request-multiple-response, the transmission protocol is any one of a Representational State Transfer Application Programming Interface Protocol, an Advanced Message Queue Interface Protocol, a Message Queuing Telemetry Transport Protocol, or a Remote Procedure Call Protocol, and the second transmission mode comprises transmitting information between the first device and the second device directly or using an intermediate node; a processing module 1520 configured to determine, based on a service parameter database, a target service corresponding to the target parameter information, where the service parameter database is used to store parameter information of different services of the second device; and a sending module 1530 configured to send a service response message to the first device, where the service response message includes description information of the target service.

The registration center in this embodiment of this application receives the service discovery request sent by the first device, where the service discovery request carries the target parameter information of the service needed by the first device, and the target parameter information includes the at least one of the information about the first transmission mode, the information about the invocation mode, the information about the transmission protocol, or the information about the second transmission mode; determines, based on the service parameter database, the target service corresponding to the target parameter information; and sends the service response message including the description information of the target service to the first device. In this way, among diversified services, a proper service can be found for the first device based on service supporting parameter information. Therefore, service quality can be improved, and system processing efficiency can be enhanced.

Optionally, the receiving module 1510 is further configured to receive a registration request sent by the second device, where the registration request includes parameter information of a first service of the second device. The processing module 1520 is further configured to store the parameter information of the first service into the service parameter database.

Optionally, the target parameter information includes the information about the first transmission mode. Additionally, the processing module 1520 is configured such that if the information about the first transmission mode is the in-band identifier, the processing module 1520 determines a service corresponding to parameter information that is in the service parameter database and that includes the in-band identifier, as the target service.

Optionally, the target parameter information includes the information about the invocation mode. The processing module 1520 is configured such that if the invocation mode is the one-request-one-response, the processing module 1520 determines a service corresponding to parameter information that is in the service parameter database and that includes information about the one-request-one-response, as the target service.

Optionally, the target parameter information includes the information about the transmission protocol. Additionally, the processing module 1520 is configured such that when the transmission protocol is the Advanced Message Queue Interface Protocol, the processing module 1520 determines a service corresponding to parameter information that is in the service parameter database and that includes information about the Advanced Message Queue Interface Protocol, as the target service.

Optionally, the target parameter information includes the second transmission mode. Additionally, the processing module 1520 is configured to determine, for the registration center when the second transmission mode comprises transmitting the information between the first device and the second device using the intermediate node, a service corresponding to parameter information that is in the service parameter database and that includes information indicating that transmission is performed using the intermediate node, as the target service.

Optionally, the target parameter information further includes location information of the intermediate node, and the intermediate node is located on a third-party device, the registration center, or the second device. Additionally, the processing module 1520 is configured to determine, when the second transmission mode is performing transmission using the intermediate node and the intermediate node is located at the third-party device, a service corresponding to parameter information that is in the service parameter database and that includes information indicating that transmission is performed using the intermediate node and that the intermediate node is located at the third-party device, as the target service.

Optionally, the network service system is a mobile edge computing system. The mobile edge computing system includes a mobile edge orchestrator and a mobile edge host. The mobile edge host includes a mobile edge platform, a first mobile edge application, and a second mobile edge application. The mobile edge platform corresponds to the registration center, the first mobile edge application corresponds to the first device, and the second mobile edge application corresponds to the second device. The mobile edge orchestrator is configured to manage the first mobile edge application and the second mobile edge application.

Optionally, the network service system is a services and systems aspects work group 6 system. The services and systems aspects work group 6 system includes a service registration server, a mission-critical service, and an external application. The service registration server corresponds to the registration center, the external application corresponds to the first device, and the mission-critical service corresponds to the second device.

Optionally, the network service system is a services and systems aspects work group 2 system. The services and systems aspects work group 2 system includes a network function repository function, a first network function instance, and a second network function instance. The network function repository function corresponds to the registration center, the first network function instance corresponds to the first device, and the second network function instance corresponds to the second device.

To sum up, the registration center in this embodiment of this application receives the service discovery request sent by the first device, where the service discovery request carries the target parameter information of the service needed by the first device, and the target parameter information includes the at least one of the information about the first transmission mode, the information about the invocation mode, the information about the transmission protocol, or the information about the second transmission mode; determines, based on the service parameter database, the target service corresponding to the target parameter information; and sends the service response message including the description information of the target service to the first device. In this way, among diversified services, a proper service can be found for the first device based on service supporting parameter information. Therefore, service quality can be improved, and system processing efficiency can be enhanced.

Figure 16:
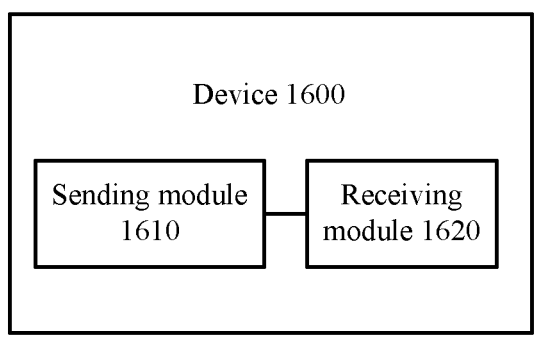
FIG. 16 is a schematic block diagram of a device according to an embodiment of this application.

FIG. 16 is a schematic block diagram of a device 1600 according to an embodiment of this application. As shown in FIG. 16, the device is applied to a network service system. The network service system includes a registration center, the device, and a second device. The device 1600 corresponds to the first device in the foregoing embodiments, and the device 1600 includes: a sending module 1610 configured to send a service discovery request, where the service discovery request carries target parameter information of a service needed by the first device and the service discovery request is used to determine, based on a service parameter database, a target service corresponding to the target parameter information, the target parameter information includes at least one of information about a first transmission mode, information about an invocation mode, information about a transmission protocol, or information about a second transmission mode, the information about the first transmission mode is an in-band identifier or an out-of-band identifier, the in-band identifier is used to indicate a transmission mode in which invocation information is added to data for transmission between the first device and the second device, the out-of-band identifier is used to indicate a transmission mode in which the data and the invocation information are separately transmitted between the first device and the second device, the invocation mode is one-request-one-response or one-request-multiple-response, the transmission protocol is any one of a Representational State Transfer Application Programming Interface Protocol, an Advanced Message Queue Interface Protocol, a Message Queuing Telemetry Transport Protocol, or a Remote Procedure Call Protocol, and the second transmission mode comprises transmitting information between the first device and the second device directly or using an intermediate node; and a receiving module 1620 configured to receive a service response message, where the service response message includes description information of the target service. The sending module 1610 is further configured to send the invocation information to the second device, where the invocation information is used to invoke the target service.

To sum up, the first device in this embodiment of this application sends the service discovery request to the registration center, where the service discovery request carries the target parameter information of the service needed by the first device and the service discovery request is used to determine, based on the service parameter database, the target service corresponding to the target parameter information, and the target parameter information includes the at least one of the information about the first transmission mode, the information about the invocation mode, the information about the transmission protocol, or the information about the second transmission mode; and receives the service response message, sent by the registration center, including the description information of the target service. In this way, among diversified services, a proper service can be found for the first device based on service supporting parameter information. Therefore, service quality can be improved, and system processing efficiency can be enhanced.

Optionally, when the second transmission mode comprises transmitting the information between the first device and the second device using the intermediate node, the target parameter information further includes a location of the intermediate node. The intermediate node is located on a third-party device, the registration center, or the second device.

Optionally, the network service system is a mobile edge computing system, which includes a mobile edge orchestrator and a mobile edge host. The mobile edge host includes a mobile edge platform, a first mobile edge application, and a second mobile edge application. The mobile edge platform corresponds to the registration center, the first mobile edge application corresponds to the device, and the second mobile edge application corresponds to the second device. The mobile edge orchestrator is configured to manage the first mobile edge application and the second mobile edge application.

Optionally, the network service system is a services and systems aspects work group 6 system, which includes a service registration server, a mission-critical service, and an external application. The service registration server corresponds to the registration center, the external application corresponds to the device, and the mission-critical service corresponds to the second device.

Optionally, the network service system is a services and systems aspects work group 2 system, which includes a network function repository function, a first network function instance, and a second network function instance. The network function repository function corresponds to the registration center, the first network function instance corresponds to the device, and the second network function instance corresponds to the second device.

To sum up, the first device in this embodiment of this application sends the service discovery request to the registration center, where the service discovery request carries the target parameter information of the service needed by the first device and the service discovery request is used to determine, based on the service parameter database, the target service corresponding to the target parameter information, and the target parameter information includes the at least one of the information about the first transmission mode, the information about the invocation mode, the information about the transmission protocol, or the information about the second transmission mode; and receives the service response message, sent by the registration center, including the description information of the target service. In this way, among diversified services, a proper service can be found for the first device based on service supporting parameter information. Therefore, service quality can be improved, and system processing efficiency can be enhanced.

Figure 17:
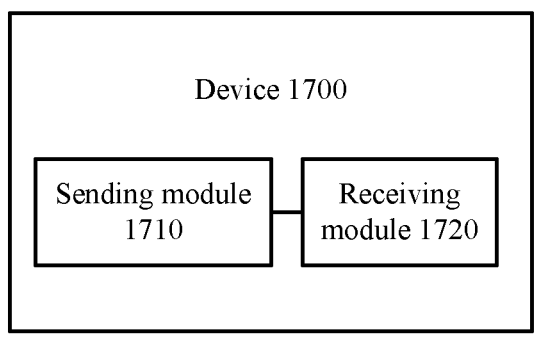
FIG. 17 is a schematic block diagram of a device according to another embodiment of this application.

FIG. 17 is a schematic block diagram of a device 1700 according to an embodiment of this application. As shown in FIG. 17, the device is applied to a network service system. The network service system includes a registration center, a first device, and the device. The device 1700 corresponds to the second device in the foregoing embodiments, and the device 1700 includes: a sending module 1710 configured to send a registration request to the registration center, where the registration request includes parameter information of a first service, such that the registration center stores the parameter information of the first service into a service parameter database, where the service parameter database is used to determine a target service corresponding to target parameter information, the target parameter information is parameter information of a service needed by the first device, the target parameter information includes at least one of information about a first transmission mode, information about an invocation mode, information about a transmission protocol, or information about a second transmission mode, the information about the first transmission mode is an in-band identifier or an out-of-band identifier, the in-band identifier is used to indicate a transmission mode in which invocation information is added to data for transmission between the first device and the second device, the out-of-band identifier is used to indicate a transmission mode in which the data and the invocation information are separately transmitted between the first device and the second device, the invocation mode is one-request-one-response or one-request-multiple-response, the transmission protocol is any one of a Representational State Transfer Application Programming Interface Protocol, an Advanced Message Queue Interface Protocol, a Message Queuing Telemetry Transport Protocol, or a Remote Procedure Call Protocol, and the second transmission mode comprises transmitting information between the first device and the second device directly or using an intermediate node; and a receiving module 1720 configured to receive the invocation information sent by the first device, where the invocation information is used to invoke the target service.

To sum up, the second device in this embodiment of this application sends the registration request to the registration center, such that the parameter database of the registration center stores parameter information of a plurality of different services. After receiving a service discovery request, the registration center queries the parameter database for parameter information satisfying a requirement, determines a service corresponding to the parameter information satisfying the requirement, and sends the description information of the service to the first device. In this way, the first device can invoke the service of the second device, and therefore the first device can obtain the service of high quality.

Optionally, when the second transmission mode comprises transmitting the information between the first device and the second device using the intermediate node, the target parameter information further includes a location of the intermediate node, which is located on a third-party device, the registration center, or the device.

Optionally, the network service system is a mobile edge computing system, which includes a mobile edge orchestrator and a mobile edge host. The mobile edge host includes a mobile edge platform, a first mobile edge application, and a second mobile edge application. The mobile edge platform corresponds to the registration center, the first mobile edge application corresponds to the first device, and the second mobile edge application corresponds to the device. The mobile edge orchestrator is configured to manage the first mobile edge application and the second mobile edge application.

Optionally, the network service system is a services and systems aspects work group 6 system, which includes a service registration server, a mission-critical service, and an external application. The service registration server corresponds to the registration center, the external application corresponds to the first device, and the mission-critical service corresponds to the device.

Optionally, the network service system is a services and systems aspects work group 2 system, which includes a network function repository function, a first network function instance, and a second network function instance. The network function repository function corresponds to the registration center, the first network function instance corresponds to the first device, and the second network function instance corresponds to the device.

To sum up, the second device in this embodiment of this application sends the registration request to the registration center, such that the parameter database of the registration center stores the parameter information of the plurality of different services. After receiving the service discovery request, the registration center queries the parameter database for the parameter information satisfying the requirement, determines the service corresponding to the parameter information satisfying the requirement, and sends the description information of the service to the first device. In this way, the first device can invoke the service of the second device, and therefore the first device can obtain the service of high quality.

Figure 18:
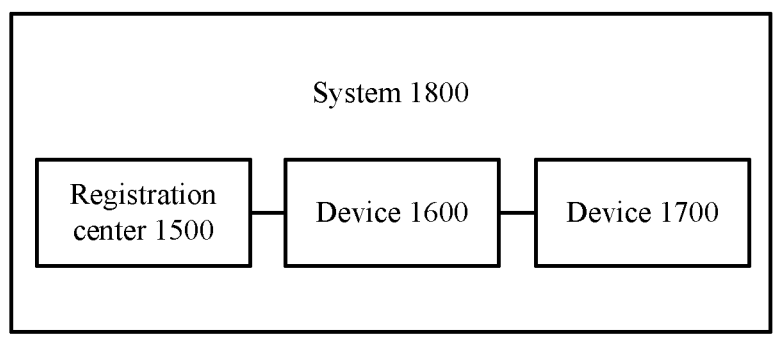
FIG. 18 is a schematic block diagram of a system according to an embodiment of this application.

FIG. 18 shows a service discovery system 1800 according to an embodiment of this application. The system 1800 includes the registration center 1500 in the embodiment shown in FIG. 15, the device 1600 in the embodiment shown in FIG. 16, and the device 1700 in the embodiment shown in FIG. 17.

Figure 19:
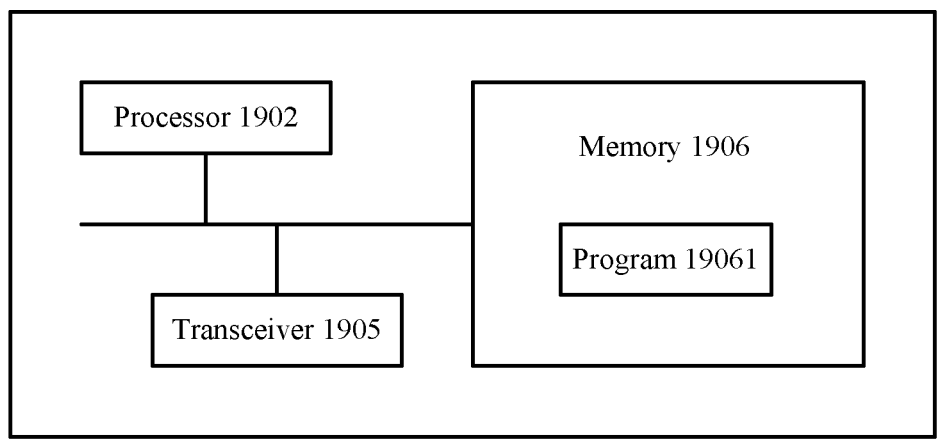
FIG. 19 is a schematic structural diagram of a registration center according to an embodiment of this application.

FIG. 19 is a schematic structural diagram of a registration center according to an embodiment of this application. As shown in FIG. 19, the registration center includes at least one processor 1902 (for example, a general purpose processor such as a central processing unit (CPU) with computing and processing capabilities, a digital signal processor (DSP), an application-specific integrated circuit (ASIC), or a field-programmable gate array (FPGA)). The processor 1902 is configured to manage and schedule modules and components in the registration center. The processing module 1520 in the embodiment shown in FIG. 15 may be implemented by the processor 1902. The registration center further includes at least one transceiver 1905 (receiver/transmitter) and a memory 1906. The receiving module 1510 and the sending module 1530 in the embodiment shown in FIG. 15 may be implemented by the transceiver 1905. The components of the registration center use an internal connection path to communicate with each other and transmit a control signal and/or a data signal.

The method disclosed in the embodiments of this application may be applied to the processor 1902, or may be used to execute an executable module, such as a computer program, stored in the memory 1906. The memory 1906 may include a high-speed random access memory (RAM), or may further include a non-volatile memory. The memory 1906 may include a read-only memory and a random access memory, and provide signaling, data, a program, or the like that is necessary, for the processor. A part of the memory may further include a non-volatile random access memory (NVRAM). A communication connection to at least one other network element is implemented (in a wired or wireless manner) using at least one transceiver 1905.

In some implementations, the memory 1906 stores a program 19061, and the processor 1902 executes the program 19061, to perform the following operations: receiving a service discovery request sent by a first device, where the service discovery request carries target parameter information of a service needed by the first device, the target parameter information includes at least one of information about a first transmission mode, information about an invocation mode, information about a transmission protocol, or information about a second transmission mode, the information about the first transmission mode is an in-band identifier or an out-of-band identifier, the in-band identifier is used to indicate a transmission mode in which invocation information is added to data for transmission between the first device and a second device, the out-of-band identifier is used to indicate a transmission mode in which the data and the invocation information are separately transmitted between the first device and the second device, the invocation mode is one-request-one-response or one-request-multiple-response, the transmission protocol is any one of a Representational State Transfer Application Programming Interface Protocol, an Advanced Message Queue Interface Protocol, a Message Queuing Telemetry Transport Protocol, or a Remote Procedure Call Protocol, and the second transmission mode comprises transmitting information between the first device and the second device directly or using an intermediate node; determining, based on a service parameter database, a target service corresponding to the target parameter information, where the service parameter database is used to store parameter information of different services of the second device; and sending a service response message to the first device, where the service response message includes description information of the target service.

It should be noted that the registration center may be the registration center in the embodiment shown in FIG. 15, and may be configured to perform each step and/or procedure corresponding to the registration center in the method embodiment.

It can be learned from the foregoing technical solution provided in this embodiment of this application that, the service discovery request sent by the first device is received, where the service discovery request carries the target parameter information of the service needed by the first device, and the target parameter information includes the at least one of the information about the first transmission mode, the information about the invocation mode, the information about the transmission protocol, or the information about the second transmission mode. The target service corresponding to the target parameter information is determined based on the service parameter database. The service response message including the description information of the target service is sent to the first device. In this way, among diversified services, a proper service can be found for the first device based on service supporting parameter information. Therefore, service quality can be improved, and system processing efficiency can be enhanced.

Figure 20:
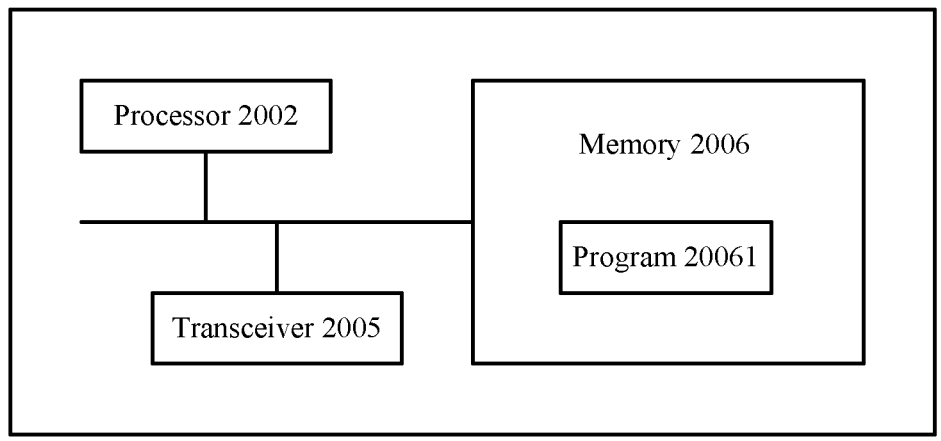
FIG. 20 is a schematic structural diagram of a device according to an embodiment of this application.

FIG. 20 is a schematic structural diagram of a device according to an embodiment of this application. As shown in FIG. 20, the device includes at least one processor 2002 (for example, a general purpose processor or CPU with computing and processing capabilities, a digital signal processor (DSP), an application-specific integrated circuit (ASIC), or a field-programmable gate array (FPGA)). The processor 2002 is configured to manage and schedule modules and components in the device. The device further includes at least one transceiver 2005 (receiver/transmitter) and a memory 2006. The sending module 1610 and the receiving module 1620 in the embodiment shown in FIG. 16 may be implemented by the transceiver 2005. The components of the device use an internal connection path to communicate with each other and transmit a control signal and/or a data signal.

The method disclosed in the embodiments of this application may be applied to the processor 2002, or may be used to execute an executable module, such as a computer program, stored in the memory 2006. The memory 2006 may include a high-speed random access memory (RAM), or may further include a non-volatile memory. The memory 2006 may include a read-only memory and a random access memory, and provide signaling, data, a program, or the like that is necessary, for the processor. A part of the memory may further include a non-volatile random access memory (NVRAM). A communication connection to at least one other network element is implemented (in a wired or wireless manner) using at least one transceiver 2005.

In some implementations, the memory 2006 stores a program 20061, and the processor 2002 executes the program 20061, to perform the following operations: sending a service discovery request, where the service discovery request carries target parameter information of a service needed by the device and the service discovery request is used to determine, based on a service parameter database, a target service corresponding to the target parameter information, the target parameter information includes at least one of information about a first transmission mode, information about an invocation mode, information about a transmission protocol, or information about a second transmission mode, the information about the first transmission mode is an in-band identifier or an out-of-band identifier, the in-band identifier is used to indicate a transmission mode in which invocation information is added to data for transmission between the first device and a second device, the out-of-band identifier is used to indicate a transmission mode in which the data and the invocation information are separately transmitted between the first device and the second device, the invocation mode is one-request-one-response or one-request-multiple-response, the transmission protocol is any one of a Representational State Transfer Application Programming Interface Protocol, an Advanced Message Queue Interface Protocol, a Message Queuing Telemetry Transport Protocol, or a Remote Procedure Call Protocol, and the second transmission mode comprises transmitting information between the first device and the second device directly or using an intermediate node; receiving a service response message, where the service response message includes description information of the target service; and sending the invocation information to the second device, where the invocation information is used to invoke the target service.

It can be learned from the foregoing technical solution provided in this embodiment of this application that, the service discovery request is sent to the registration center, where the service discovery request carries the target parameter information of the service needed by the first device and the service discovery request is used to determine, based on the service parameter database, the target service corresponding to the target parameter information, and the target parameter information includes the at least one of the information about the first transmission mode, the information about the invocation mode, the information about the transmission protocol, or the information about the second transmission mode; and the service response message, sent by the registration center, including the description information of the target service is received. In this way, among diversified services, a proper service can be found for the first device based on service supporting parameter information. Therefore, service quality can be improved, and system processing efficiency can be enhanced.

Figure 21:
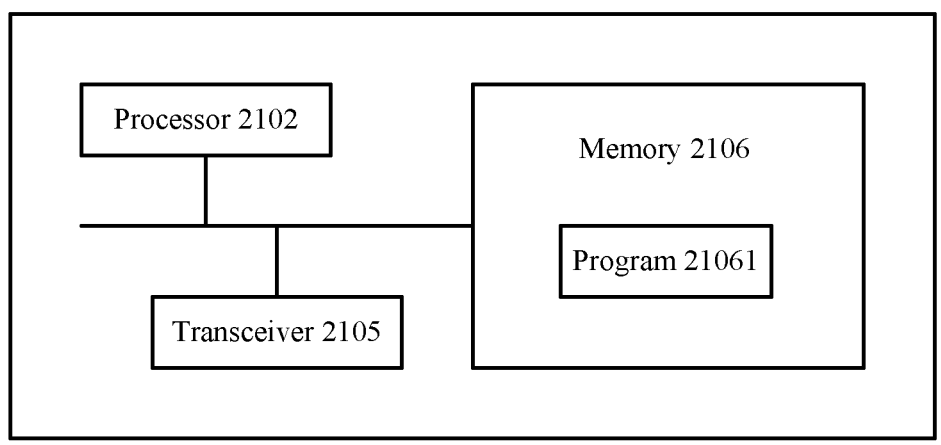
FIG. 21 is a schematic structural diagram of a device according to another embodiment of this application.

FIG. 21 is a schematic structural diagram of a device according to an embodiment of this application. As shown in FIG. 21, the device includes at least one processor 2102 (for example, a general purpose processor or CPU with computing and processing capabilities, a digital signal processor (DSP), an application-specific integrated circuit (ASIC), or a field-programmable gate array (FPGA)). The processor 2102 is configured to manage and schedule modules and components in the device. The device further includes at least one transceiver 2105 (receiver/transmitter) and a memory 2106. The sending module 1710 and the receiving module 1720 in the embodiment shown in FIG. 17 may be implemented by the transceiver 2105. The components of the device use an internal connection path to communicate with each other and transmit a control signal and/or a data signal.

The method disclosed in the embodiments of this application may be applied to the processor 2102, or may be used to execute an executable module, such as a computer program, stored in the memory 2106. The memory 2106 may include a high-speed random access memory (RAM), or may further include a non-volatile memory (NVM). The memory 2106 may include a read-only memory and a random access memory, and provide signaling, data, a program, or the like that is necessary, for the processor. A part of the memory may further include a non-volatile random access memory (NVRAM). A communication connection to at least one other network element is implemented (in a wired or wireless manner) using at least one transceiver 2105.

In some implementations, the memory 2106 stores a program 21061, and the processor 2102 executes the program 21061, to perform the following operations: sending a registration request to a registration center, where the registration request includes parameter information of a first service, such that the registration center stores the parameter information of the first service into a service parameter database, where the service parameter database is used to determine a target service corresponding to target parameter information, the target parameter information is parameter information of a service needed by a first device, the target parameter information includes at least one of information about a first transmission mode, information about an invocation mode, information about a transmission protocol, or information about a second transmission mode, the information about the first transmission mode is an in-band identifier or an out-of-band identifier, the in-band identifier is used to indicate a transmission mode in which invocation information is added to data for transmission between the first device and the second device, the out-of-band identifier is used to indicate a transmission mode in which the data and the invocation information are separately transmitted between the first device and the second device, the invocation mode is one-request-one-response or one-request-multiple-response, the transmission protocol is any one of a Representational State Transfer Application Programming Interface Protocol, an Advanced Message Queue Interface Protocol, a Message Queuing Telemetry Transport Protocol, or a Remote Procedure Call Protocol, and the second transmission mode comprises transmitting information between the first device and the second device directly or using an intermediate node; and receiving the invocation information sent by the first device, where the invocation information is used to invoke the target service.

It can be learned from the foregoing technical solution provided in this embodiment of this application that, the registration request is sent to the registration center, such that the parameter database of the registration center stores parameter information of a plurality of different services. After receiving a service discovery request, the registration center queries the parameter database for parameter information satisfying a requirement, determines a service corresponding to the parameter information satisfying the requirement, and sends the description information of the service to the first device. In this way, the first device can invoke the service of the second device, and therefore the first device can obtain the service of high quality.

An embodiment of this application further provides a computer storage medium, and the computer storage medium may store a program instruction for executing any one of the foregoing methods.

Optionally, the storage medium may be the memory 1906, 2006, or 2106.

A person of ordinary skill in the art may be aware that, units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of ease and brevity of description, for detailed working processes of the foregoing system, apparatus, and unit, reference may be made to corresponding processes in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or may be integrated into another system, or some features may be ignored or not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions of the embodiments.

In addition, functional units in the embodiments of this application may be integrated into one processing unit, or each of the units may exist alone physically, or at least two units may be integrated into one unit.

When the function is implemented in a form of a software functional unit and sold or used as an independent product, the function may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service discovery method implemented by a registration center, the service discovery method comprising:
receiving a service discovery request from a first device, wherein the service discovery request carries target parameter information of a service needed by the first device, and wherein the target parameter information comprises information about an invocation mode;
determining, based on a service parameter database of the registration center storing parameter information of different services of a second device, a target service corresponding to first parameter information in the service parameter database, wherein the first parameter information comprises information about one of:
a one-request-one-response as the target service when the invocation mode is the one-request-one-response; or
a one-request-multiple-response as the target service when the invocation mode is the one-request-multiple-response;
storing, in the service parameter database, second parameter information of a first service of the second device, wherein the second parameter information is received via a request message from the second device before determining the target service; and
sending a service response message to the first device, wherein the service response message comprises description information of the target service.

2. The service discovery method of claim 1, wherein the target parameter information further comprises at least one of information about a first transmission mode or information about a second transmission mode, wherein the information about the first transmission mode is an in-band identifier or an out-of-band identifier, wherein the in-band identifier indicates a transmission mode in which invocation information is added to data for transmission between the first device and the second device, wherein the out-of-band identifier indicates a transmission mode in which the data and the invocation information are separately transmitted between the first device and the second device, and wherein the second transmission mode comprises transmitting information between the first device and the second device directly or using an intermediate node.

3. The service discovery method of claim 2, wherein the target parameter information further includes a location of the intermediate node when the second transmission mode comprises transmitting the information between the first device and the second device using the intermediate node, and wherein the intermediate node is located on a third-party device, the registration center, or the second device.

4. The service discovery method of claim 1, wherein the target parameter information further comprises information about a transmission protocol.

5. The service discovery method of claim 4, wherein the transmission protocol is an Advanced Message Queuing Protocol (AMQP).

6. The service discovery method of claim 4, wherein the transmission protocol is a Message Queuing Telemetry Transport (MQTT) Protocol.

7. The service discovery method of claim 4, wherein the transmission protocol is a Remote Procedure Call (RPC) Protocol.

8. A communications apparatus comprising:
a processor; and
a memory coupled to the processor and comprising instructions that, when executed by the processor, cause the communications apparatus to:
  receive a service discovery request from a first device, wherein the service discovery request carries target parameter information of a service needed by the first device, and wherein the target parameter information comprises information about an invocation mode;
  determine, based on a service parameter database of a registration center storing parameter information of different services of a second device, a target service corresponding to first parameter information in the service parameter database, wherein the first parameter information comprises information about one of:
    a one-request-one-response as the target service when the invocation mode is the one-request-one-response; or
    a one-request-multiple-response as the target service when the invocation mode is the one-request-multiple-response;
  store, into the service parameter database, second parameter information of a first service of the second device, wherein the second parameter information is received via a request message from the second device; and
  send a service response message to the first device, wherein the service response message comprises description information of the target service.

9. A service discovery method comprising:
sending, by a first device, a service discovery request to a registration center, wherein the service discovery request carries target parameter information of a service needed by the first device, and wherein the target parameter information comprises information about an invocation mode;
determining, by the registration center based on a service parameter database of the registration center storing parameter information of different services of a second device, a target service corresponding to first parameter information in the service parameter database, wherein the first parameter information comprises information about one of:
  a one-request-one-response as the target service when the invocation mode is the one-request-one-response; or
  a one-request-multiple-response as the target service when the invocation mode is the one-request-multiple-response;
storing, in the service parameter database before determining the target service, second parameter information of a first service of the second device, wherein the second parameter information is received via a request message from the second device; and
sending, by the registration center, a service response message to the first device, wherein the service response message comprises description information of the target service.

10. The service discovery method of claim 9, wherein determining the target service is further based on a transmission protocol for the service needed by the first device.

11. The service discovery method of claim 10, wherein the target parameter information further comprises information about the transmission protocol.

12. The service discovery method of claim 10, wherein the transmission protocol is one of an Advanced Message Queuing Protocol (AMQP), a Message Queuing Telemetry Transport (MQTT) Protocol, or a Remote Procedure Call (RPC) Protocol.

13. A communications system comprising:
a first device configured to send a service discovery request, wherein the service discovery request carries target parameter information of a service needed by the first device, and wherein the target parameter information comprises information about an invocation mode; and
a registration center configured to:
  receive the service discovery request from the first device;
  determine, based on a service parameter database of the registration center storing parameter information of different services of a second device, a target service corresponding to first parameter information in the service parameter database, wherein the first parameter information comprises information about one of:
    a one-request-one-response as the target service when the invocation mode is the one-request-one-response; or
    a one-request-multiple-response as the target service when the invocation mode is the one-request-multiple-response;
  store, into the service parameter database before determining the target service, second parameter information of a first service of the second device, wherein the second parameter information is received via a request message from the second device; and
  send a service response message to the first device, wherein the service response message comprises description information of the target service.

* * * * *